(12) United States Patent
Tsou et al.

(10) Patent No.: US 12,557,558 B2
(45) Date of Patent: Feb. 17, 2026

(54) MEMORY DEVICE AND FORMATION METHOD THEREOF

(71) Applicants: TAIWAN SEMICONDUCTOR MANUFACTURING COMPANY, LTD., Hsinchu (TW); NATIONAL TAIWAN UNIVERSITY, Taipei (TW)

(72) Inventors: Ya-Jui Tsou, Taichung (TW); Jih-Chao Chiu, New Taipei (TW); Huan-Chi Shih, Chiayi County (TW); Chee-Wee Liu, Taipei (TW); Shao-Yu Lin, Taichung (TW); Chih-Lin Wang, Hsinchu County (TW)

(73) Assignees: TAIWAN SEMICONDUCTOR MANUFACTURING COMPANY, LTD., Hsinchu (TW); NATIONAL TAIWAN UNIVERSITY, Taipei (TW)

( * ) Notice: Subject to any disclaimer, the term of this patent is extended or adjusted under 35 U.S.C. 154(b) by 679 days.

(21) Appl. No.: 17/831,187

(22) Filed: Jun. 2, 2022

(65) Prior Publication Data

US 2023/0397501 A1 Dec. 7, 2023

(51) Int. Cl.
*H10N 50/80* (2023.01)
*G11C 11/16* (2006.01)
*H10B 61/00* (2023.01)
*H10N 50/01* (2023.01)
(Continued)

(52) U.S. Cl.
CPC .......... *H10N 50/80* (2023.02); *G11C 11/161* (2013.01); *H10B 61/22* (2023.02); *H10N 50/01* (2023.02); *H10N 50/10* (2023.02); *H10N 50/85* (2023.02); *G11C 11/1675* (2013.01); *G11C 11/1693* (2013.01)

(58) Field of Classification Search
CPC ......... H10N 50/80; H10N 50/10; H10N 50/85
See application file for complete search history.

(56) References Cited

U.S. PATENT DOCUMENTS

2014/0250244 A1* 9/2014 Song ............... H10B 61/00 710/5
2017/0345869 A1* 11/2017 Park ............... G11C 11/161
(Continued)

FOREIGN PATENT DOCUMENTS

CN 110890458 B * 4/2024 ............. H10N 50/10

OTHER PUBLICATIONS

Hu, G. et al., "Key parameters affecting STT-MRAM switching efficiency and improved device performance of 400° C.-compatible P-mtjs", 2017 IEEE International Electron Devices Meeting (IEDM), pp. 844-847.
(Continued)

*Primary Examiner* — Alia Sabur
(74) *Attorney, Agent, or Firm* — Maschoff Brennan

(57) ABSTRACT

A method of forming a memory device including forming a bottom electrode via (BEVA) in a dielectric layer, forming a magnetic tunnel junction (MTJ) multilayer structure over the BEVA, forming a top electrode on the MTJ multilayer structure, patterning the MTJ multilayer structure using the top electrode as an etch mask to form a MTJ stack, forming a first interlayer dielectric (ILD) layer over the MTJ stack, and after forming the first ILD layer, forming a ferromagnetic metal that exerts a magnetic field on the MTJ stack.

20 Claims, 37 Drawing Sheets

(51) Int. Cl.
*H10N 50/10* (2023.01)
*H10N 50/85* (2023.01)

(56) References Cited

U.S. PATENT DOCUMENTS

2018/0159023 A1* 6/2018 Suh .................. H10N 50/80
2022/0180911 A1* 6/2022 Zare .................. G11C 11/161

OTHER PUBLICATIONS

Slaughter, J. M. et al., "High Speed Toggle MRAM with MGO-based tunnel junctions", IEEE, Dec. 5, 2005.

\* cited by examiner

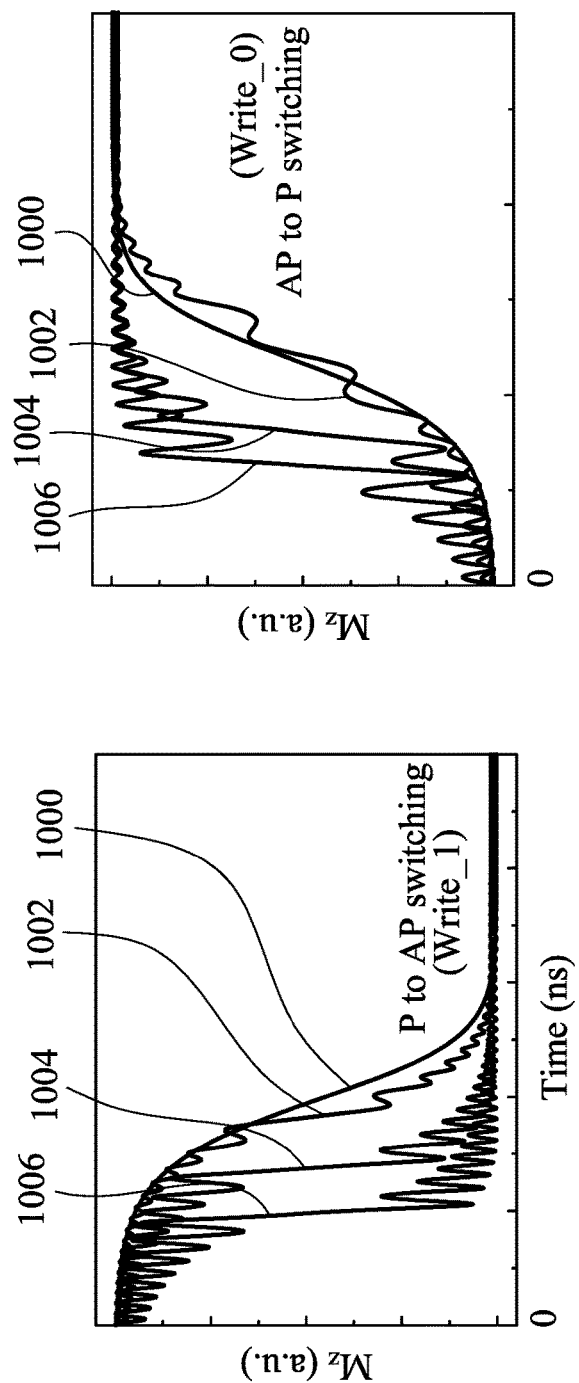
Fig. 3A
Fig. 3B
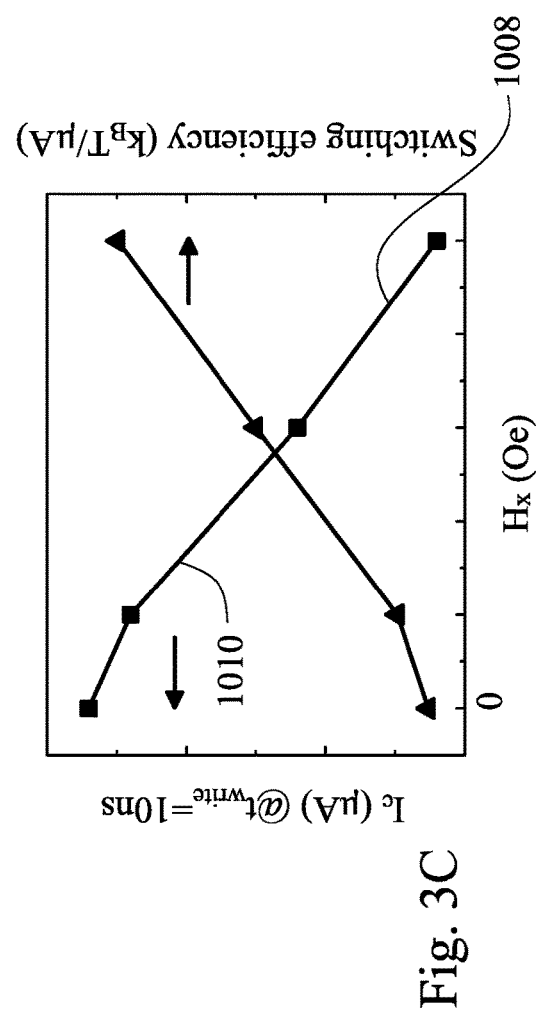
Fig. 3C

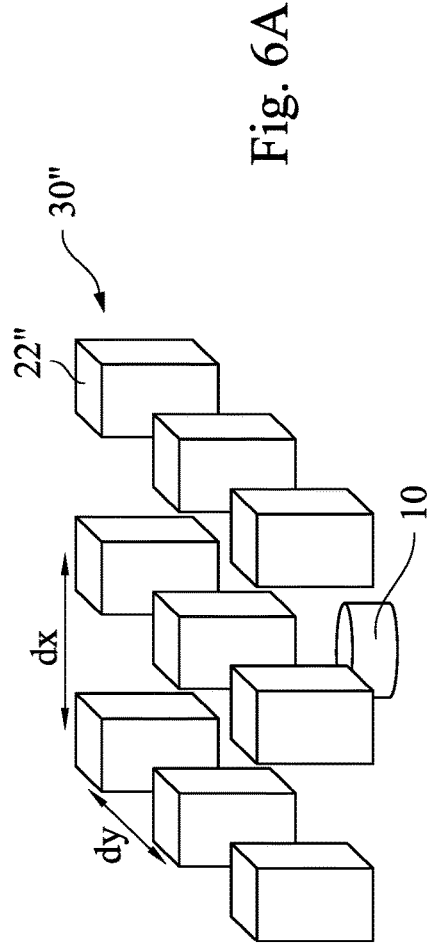
Fig. 6A
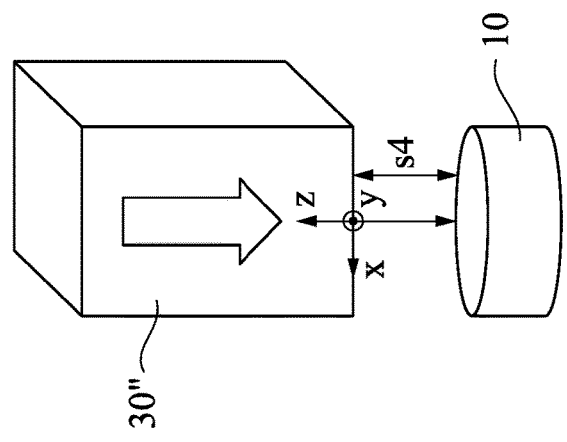
Fig. 6B
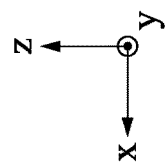

MEMORY DEVICE AND FORMATION METHOD THEREOF

BACKGROUND

In integrated circuit (IC) devices, magnetoresistive random access memory (MRAM) is an emerging technology for next generation embedded memory devices. MRAM is a non-volatile memory where data is stored in magnetic storage elements. In simple configurations, each cell has two ferromagnetic plates, each of which can hold a magnetic field, separated by a thin insulating layer. MRAM has a simple cell structure and complementary metal oxide semiconductor (CMOS) logic comparable processes which result in a reduction of the manufacturing complexity and cost in comparison with other non volatile memory structures.

BRIEF DESCRIPTION OF THE DRAWINGS

Aspects of the present disclosure are best understood from the following detailed description when read with the accompanying Figures. It is noted that, in accordance with the standard practice in the industry, various features are not drawn to scale. In fact, the dimensions of the various features may be arbitrarily increased or reduced for clarity of discussion.

FIGS. 3A and 3B are diagrams showing a z-component of the magnetization ($M_z$) versus time in P to AP switching and in AP to P switching of the MRAM device, respectively.

FIG. 3C is a diagram showing a critical current ($I_c$) at write time of 10 ns and switching efficiency versus magnetic field ($H_x$) in P to AP switching of the MRAM device.

FIGS. 6A-6B show perspective views of a memory device including a MTJ structure and a 3×3 magnetic array formed by magnetic field induced elements over a top of the MTJ structure in accordance with some other embodiments.

DETAILED DESCRIPTION

Figure 1:
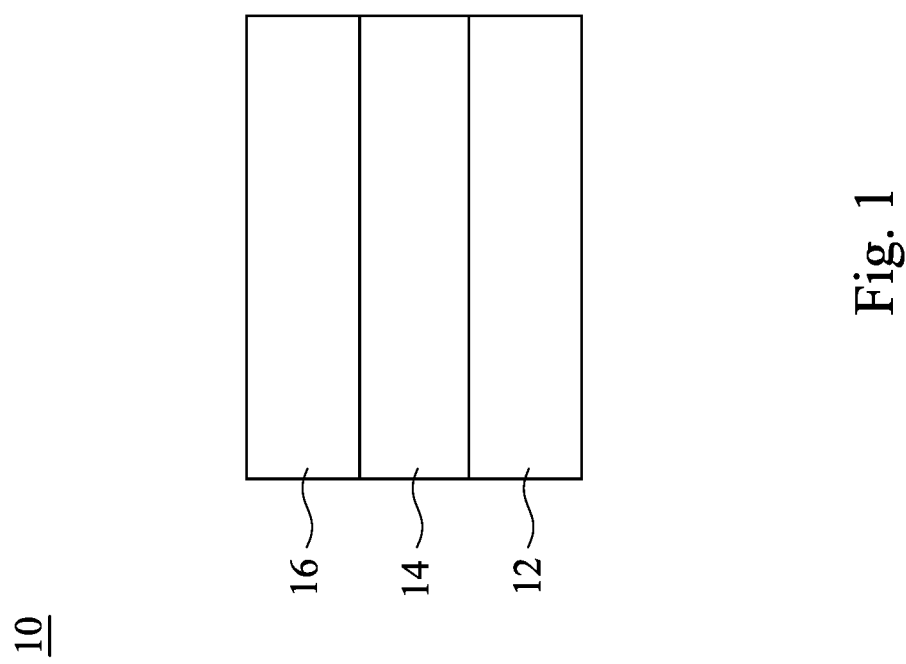
FIG. 1 is a cross-section view of a perpendicular magnetic tunnel junction (MTJ) structure in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the Figures. The spatially relative terms are intended to encompass different orientations of the device in use or operation in addition to the orientation depicted in the Figures. The apparatus may be otherwise oriented (rotated 90 degrees or at other orientations) and the spatially relative descriptors used herein may likewise be interpreted accordingly.

Magneto-resistive random-access memory (MRAM) cells each comprise a magnetic tunnel junction (MTJ) cell vertically arranged within an integrated chip back-end-of-the-line (BEOL) between conductive electrodes. An MTJ cell includes first and second ferromagnetic layers separated by a tunnel barrier layer. One of the ferromagnetic layers (often referred to as a "reference layer" or "pinned layer") has a fixed magnetization direction, while the other ferromagnetic layer (often referred to as a "free layer") has a variable magnetization direction. For MTJ cells with positive tunnel magnetoresistance (TMR), if the magnetization directions of the reference layer and free layer are in a parallel orientation, it is more likely that electrons will tunnel through the tunnel barrier layer, such that the MTJ cell is in a low-resistance state. Conversely, if the magnetization directions of the reference layer and free layer are in an anti-parallel orientation, it is less likely that electrons will tunnel through the tunnel barrier layer, such that the MTJ cell is in a high-resistance state. Consequently, the MTJ cell can be switched between two states of electrical resistance, a first state with a low resistance ($R_P$: magnetization directions of reference layer and free layer are parallel) and a second state with a high resistance ($R_{AP}$: magnetization directions of reference layer and free layer are anti-parallel). Because of their binary nature, MTJ cells can be used to store digital data, with the low resistance state $R_P$ corresponding to a first data state (e.g., logical "0"), and the high-resistance state $R_{AP}$ corresponding to a second data state (e.g., logical "1").

Each MRAM cell includes a MTJ cell and an access transistor serving to access the MTJ cell (e.g., to read data from the MTJ cell and/or write data to the MTJ cell). A Gate terminal of the access transistor is coupled to a word line, a source terminal of the access transistor is coupled to a source line, a drain terminal of the access transistor is coupled to one end of the MTJ cell, and another end of the MTJ cell is coupled to a bit line. To write data to an MRAM cell, a current greater than a critical current ($I_c$) required to switch a magnetization direction of free layer is provided through the MTJ cell. Currents that are not greater than the critical current will not cause a switching in the magnetization direction of free layer and therefore not write data to the MRAM cell. During a write operation, a voltage greater than a threshold voltage of the access transistor is applied to the word line, thereby turning on the access transistor to form a conductive path between the source line and the MTJ cell. The bit line voltage and the source line voltage thus form a potential difference that causes a current, which is greater than the critical current, to flow through the MTJ cell.

Switching efficiency of the MTJ cell to switch the magnetization direction of the free layer from one direction to the other depends on the critical current. Because switching from parallel configuration to anti-parallel configuration (referred to as P-to-AP switching in some embodiments) is triggered by minority spin electrons, there may be an incubation delay of several nanoseconds which would potentially limits the write latency. The P-to-AP switching speed is proportional to an initial torque of the free layer. The initial torque of the free layer is restricted by the initial angle of the magnetization of the free layer from the z-axis (normal to the plane of the MTJ substructure) in a perpendicular MTJ structure. As used herein, "perpendicular" corresponds to a direction that is substantially perpendicular to one or more of the layers of the magnetic junction.

In embodiments of the present disclosure, to increase the initial angle of the magnetization of the free layer from the z-axis, a magnetic field induced element is disposed on one side of the MTJ structure, which in turn improves the P-to-AP switching speed to reduce the switching speed difference between the P-to-AP switching and the AP-to-P switching. As a result, the switching asymmetry of the MTJ structure can be mitigated. In some embodiments, the magnetic field induced element includes Fe/Co-based alloy, CoFeB, CoFe, FeB, Fe, Co, or the like, which is compatible with back-end of line (BEOL) process. Further, an additional current through a metal line to generate a magnetic field is not required, which in turn prevents disturbing the whole column of the MTJ structures in an integrated device.

FIG. 1 is a cross-section view of a perpendicular magnetic tunnel junction (MTJ) structure (also referred to as MTJ cell) 10 in accordance with some embodiments. In some embodiments, the MTJ structure 10 includes a first ferromagnetic layer (reference layer 12), a second ferromagnetic layer (free layer 16) and a non-magnetic layer (tunnel barrier layer 14). The reference layer 12 is also referred to as a pinned layer or a fixed layer. The tunnel barrier layer is also referred to as a tunnel barrier layer. In some embodiments, the tunnel barrier layer 14 may include magnesium oxide (MgO) or spinel $MgAl_2O_4$ (MAO). The tunnel barrier layer is thin enough to allow quantum mechanical tunneling of current between the ferromagnetic reference layer and the ferromagnetic free layer.

In some embodiments, the reference layer 12 and the free layer 16 may be a single layer or a multi-layer structure. For example, the free layer 16 may include Fe/Co-based alloy, CoFeB, CoFe, FeB, Fe, Co, or the like. The reference layer 12 may include CoFeB, CoFe, FeB, Fe, or the like. The free layer 16 has a magnetization direction which is free to be switched by a spin transfer process when MTJ cell receives a current higher than or equal to a critical current that is sufficient to switch the magnetization direction of the free layer 16. Therefore, the free layer 16 is capable of changing its magnetization direction between one of two magnetization states, which cause two different MTJ resistances that correspond to the binary data state. By contrast, the reference layer 12 has a magnetic direction that is fixed because, for example, it is pinned by a pinned layer.

Figure 2A:
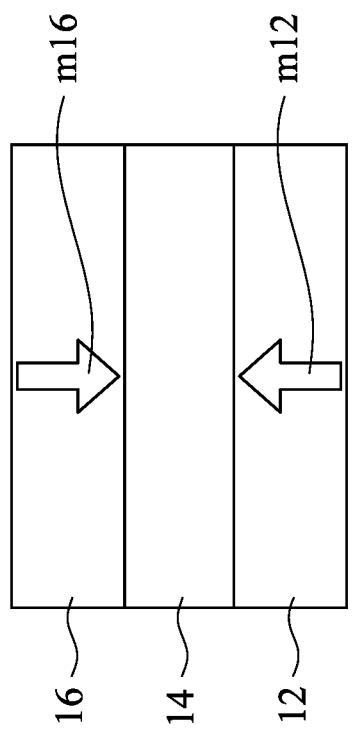
FIG. 2A illustrates the magnetization directions of the free layer and the reference layer in a parallel configuration.

FIG. 2A illustrates the magnetization directions of the free layer 16 and the reference layer 12 in a parallel configuration. In the parallel configuration, the magnetization direction m16 of the free layer 16 is the same as the magnetization direction m12 of the reference layer 12. In this example, the magnetization direction m12 of the reference layer 12 and the magnetization direction m16 of the free layer 16 are both in the upward direction. The magnetization direction of the free layer 16 relative to the reference layer 12 changes the electrical resistance of the MTJ structure 10. In accordance with some implementations, the electrical resistance of the MTJ structure 10 is low when the magnetization direction m16 of the free layer 16 is the same as the magnetization direction m12 of the reference layer 12. Accordingly, the MTJ cell having the parallel configuration is also referred to as a "low (electrical) resistance" state.

Figure 2B:
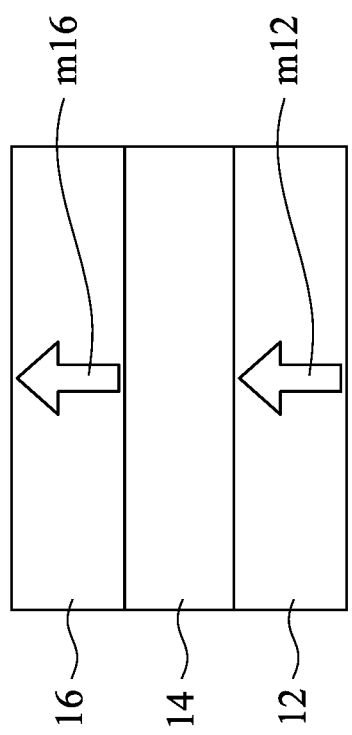
FIG. 2B illustrates the magnetization directions of the free layer and the reference layer in an anti-parallel configuration.

FIG. 2B illustrates the magnetization directions of the free layer 16 and the reference layer 12 in an anti-parallel configuration. In the anti-parallel configuration, the magnetization direction m16 of the free layer 16 is opposite to the magnetization direction m12 of the reference layer 12. In accordance with some implementations, the electrical resistance of the MTJ structure 10 is high when the magnetization direction m16 of the free layer 16 is the opposite of the magnetization direction m12 of the reference layer 12. Accordingly, the MTJ cell having the anti-parallel configuration is also referred to as a "high (electrical) resistance" state.

Thus, by changing the magnetization direction of the free layer 16 relative to that of the reference layer 12, the resistance state of the MTJ structure 10 can be varied between the low resistance state, which corresponds to a first data state (e.g., logical "0") and the high resistance state, which corresponds to a second data state (e.g., logical "1"). Such binary logic data ("0" and "1") can be stored in the MTJ cell. Further, since the stored data does not require a storage energy source, the memory is non-volatile.

Although FIGS. 2A-2B show parallel and anti-parallel configurations with the MTJ structure 10, in some implementations, an in-plane MTJ structure (e.g., the easy axis of the MTJ is in-plane), or an MTJ structure with an arbitrary preferred angle, is used instead.

In general, electrons possess a spin, a quantized number of angular momentum intrinsic to the electron. An electrical current is generally unpolarized, e.g., it consists of 50% spin up and 50% spin down electrons. When a current is applied though a ferromagnetic layer, the electrons are polarized with spin orientation corresponding to the magnetization direction of the ferromagnetic layer, thus producing a spin-polarized current (or spin-polarized electrons).

As described earlier, the magnetization direction of the reference layer 12 is "fixed" in an MTJ structure 10. Therefore, spin-polarized electrons can be used to switch the magnetization direction m16 of the free layer 16 in the MTJ structure 10 (e.g., switching between parallel and anti-parallel configurations).

As will be explained in further detail, when spin-polarized electrons travel to the magnetic region of the free layer 16 in the MTJ structure 10, the electrons will transfer a portion of their spin-angular momentum to the free layer 16, to produce a torque on the magnetization of the free layer 16. When sufficient torque is applied, the magnetization of the free layer 16 switches, which, in effect, writes either a "1" or a "0" based on whether the free layer 16 is in the parallel or anti-parallel configuration relative to the reference layer 12.

Figure 2C:
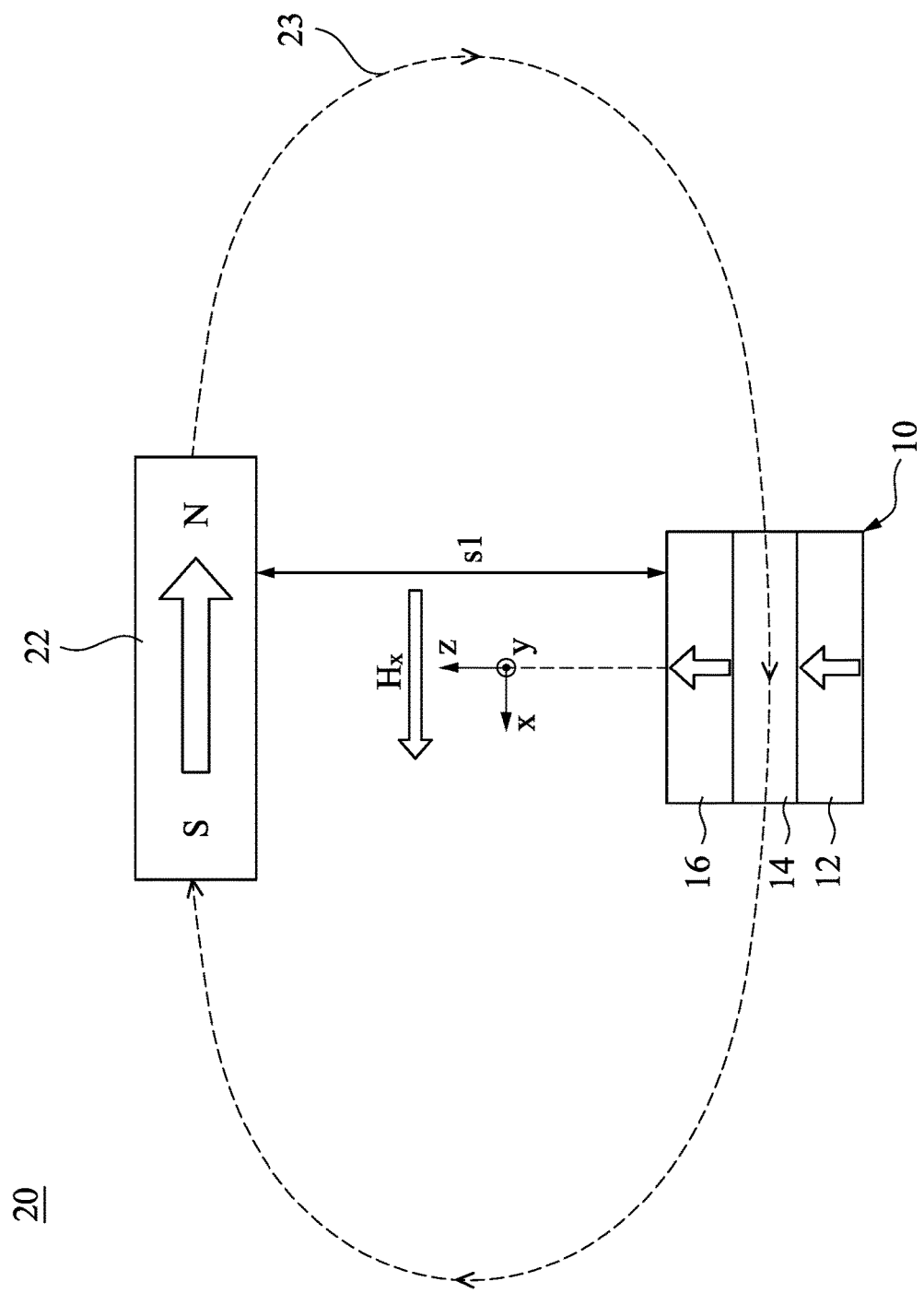
FIG. 2C illustrates a magnetic random access memory (MRAM) device including a MTJ structure and a magnetic induced element over the MTJ structure in accordance with some embodiments.
Figure 2D:
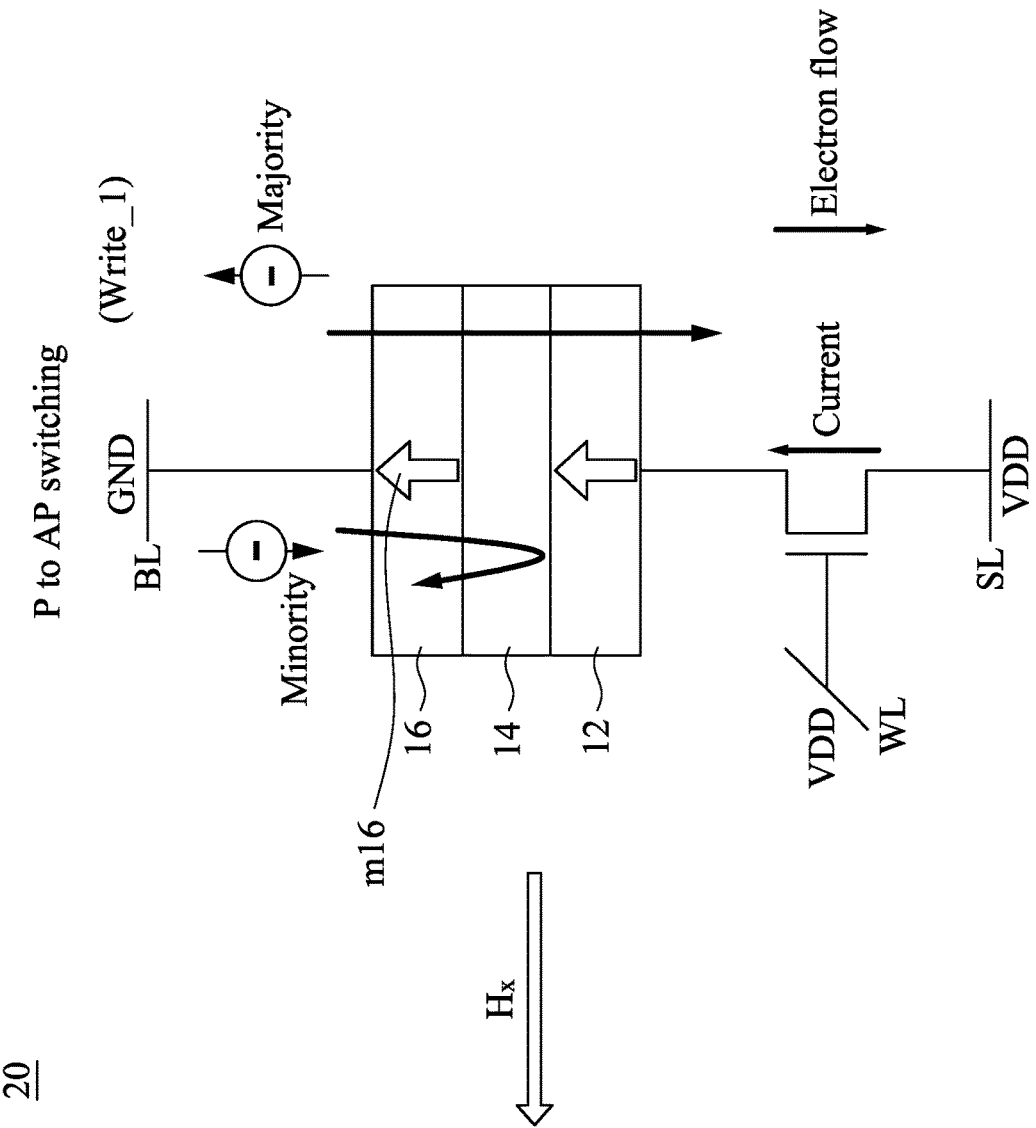
FIG. 2D is the process of P-to-AP of the MRAM device in accordance with some embodiments.

FIG. 2C illustrates a magnetic random access memory (MRAM) device 20 including a MTJ structure 10 and a magnetic field induced element 22 over the MTJ structure 10 in accordance with some embodiments. FIG. 2D is the process of P-to-AP switching of the MRAM device 20 in accordance with some embodiments. In accordance with some implementations, spin-transfer torque (STT) is used to switch the magnetization directions of the MTJ structure 10. STT is an effect in which the magnetization direction of a ferromagnetic layer in an MTJ is switched using a spin-polarized current.

The MTJ structure 10 with the reference layer 12, the tunnel barrier layer 14, the free layer 16 and a transistor 24. The MTJ structure 10 is coupled to a bit line BL and a source line SL via the transistor 24, which is operated by a word line WL. The reference layer 12, the tunnel barrier layer 14 and the free layer 16 collectively serve as the MTJ structure 10 as described in FIG. 1. In some embodiments, the MRAM device 20 is a spin-transfer torque magnetic random access memory (STT-MRAM) device including additional read/write circuitry, one or more additional transistors, one or more sense amplifiers, and/or other components (not shown).

The MTJ structure 10 is also referred to as an MRAM cell. In some embodiments, the MRAM device 20 contains multiple MRAM cells (e.g., hundreds or thousands of MRAM cells) arranged in an array coupled to respective bit lines and source lines. During a read/write operation, a voltage VDD is applied between the bit line BL and the source line SL (corresponding to a "0" or "1" value), and the word line WL enable current to flow between the bit line BL to the source line SL. In a write operation, the current is sufficient to change a magnetization of the free layer and thus, depending on the direction of electron flow, bits of "0" and "1" are written into the MRAM device 20. In a read operation, the current is insufficient to change the magnetization of the free layer 16. Instead, a resistance across the MRAM device 20 is determined (e.g., with a low resistance corresponding to a logical "0" and a high resistance corresponding to a logical "1."

In FIGS. 2C-2D, the MTJ structure 10 is in the parallel configuration. To initiate switching to the anti-parallel configuration, a current is applied such that electrons flow in accordance with electron flow in FIG. 2D. For example, in write operation Write_1 of the free layer 16 to write "1" into the MRAM device 20, the transistor 24 is turned on by applying a voltage VDD to the word line WL. The source line voltage is VDD and the bit line voltage is ground voltage. The electrons flow from the free layer 16 to the reference layer 12. As the electrons flow through the free layer 16, they are polarized by the free layer 16 and have spin orientation corresponding to the magnetization direction m16 of the free layer 16.

The MTJ structure in the parallel (low resistance state) configuration has lower electrical resistance, therefore, in some implementations and instances, the majority of the spin-polarized electrons tunnel through the free layer 16. Minority spin electrons that are polarized with direction opposite to the magnetization direction m16 of the free layer 16 are reflected at the barrier interfaces of the tunnel barrier layer 14. The reflected spin electrons then exert torque on the magnetization m16 of the free layer 16, eventually leading to a switch of the magnetization direction m16 of the free layer 16 in FIG. 2A to a magnetization direction m16 in FIG. 2B. Thus, the MTJ structure 10 is switched from the parallel (low resistance state) configuration to the anti-parallel (high resistance state) configuration.

Figure 2E:
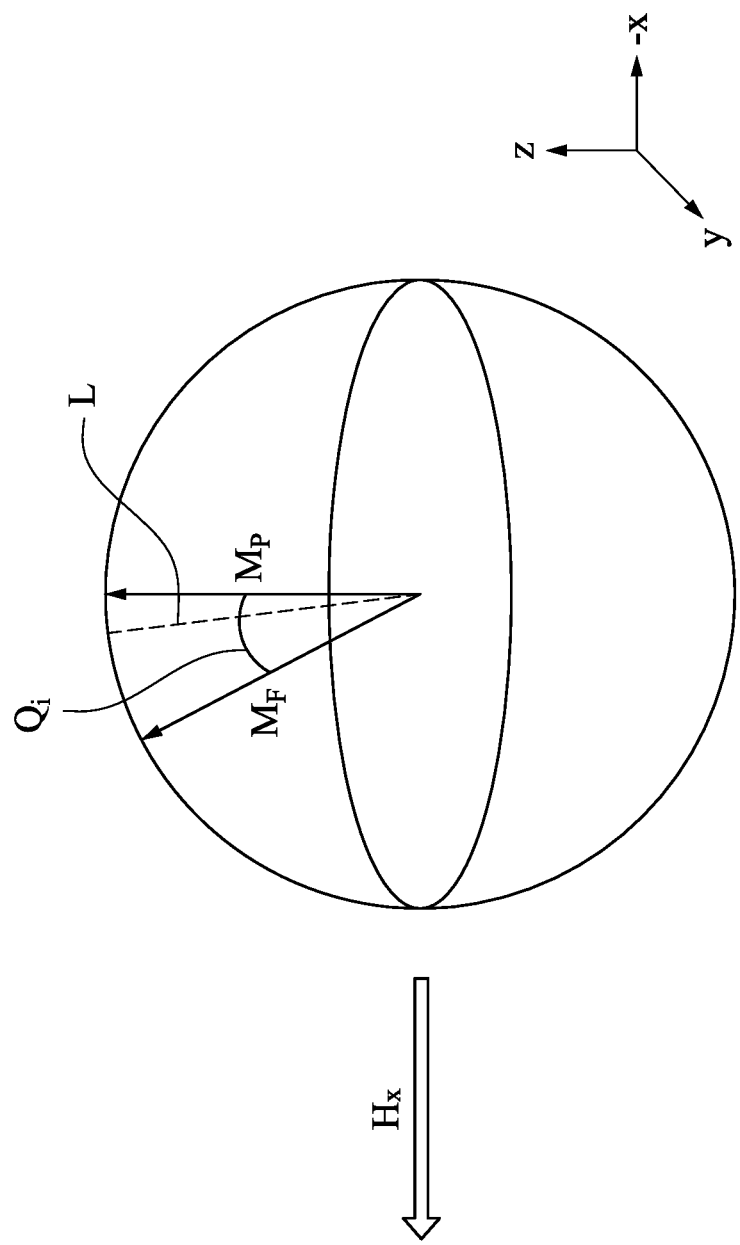
FIG. 2E is a diagram showing magnetization of free layer and magnetization of reference layer.

The magnetic field induced element 22 is spaced apart from the MTJ structure 10 by a z-direction spacing s1. The magnetic field induced element 22 is a permanent magnet, such as Fe/Co-based alloy, CoFeB, CoFe, FeB, Fe, Co, or the like. A north pole N of the magnetic field induced element 22 is located on one end and a south pole S of the magnetic field induced element 22 on the other end across the x-axis. The magnetic field induced element 22 can provide a magnetic field having magnetic field lines 23 radiating from the north pole N to the south pole S. The magnetic field is along the x-axis. FIG. 2E is a diagram showing magnetization of free layer 16 and magnetization of the reference layer 12. As shown in FIG. 2D-2E, symbol "$M_p$" stands for magnetization of the reference layer 12, which is along the z-axis. A dotted line L represents an actual magnetization of the free layer 16 in condition without applying a magnetic field $H_x$. Symbol "$M_F$" stands for magnetization of the free layer 16. In the spin transfer torque phenomenon, the magnetic torque is proportional to $M_F \times (M_F \times M_P)$, where x represents a vector cross product, which relies on the initial magnetization direction of the free layer 16. Due to the magnetic field $H_x$ provided by the magnetic field induced element 22, the initial angle $\Theta_i$ of the magnetization $M_F$ of the free layer 16 from the z-axis can be increased, which in turn gives rise to a high initial magnetic torque on the free layer 16. As discussed previously, the P-to-AP switching speed is proportional to the initial torque of the free layer 16. Due to the high initial magnetic torque of the free layer 12, the P-to-AP switching speed can be improved.

In some embodiments, the magnetic field induced element 22 can provide a magnetic field of 1 Oe to 10 k Oe in in-plane and/or out-of-plane direction. The geometry of magnetic field induced element 22 can be a cylinder, rectangular cylinder, cuboid, a thin film on back end of line (BEOL) trench, and with or without rounded corners. In some embodiments, the magnetic induced element 22 has a thickness in a range from 0.1 nm to 1 μm.

FIGS. 3A-3C are graphs illustrating a magnetic field dependence on the critical current for the MRAM device 20. FIGS. 3A and 3B are diagrams showing a z-component of the magnetization ($M_z$) versus time in P to AP switching of the MRAM device 20, writing the bit "1," and in AP to P switching of the MRAM device 20, writing the bit "0," respectively, by applying a write current. In FIG. 3A, a write current of 80 μA is applied to the MRAM device 20. In FIG. 3B, a write current of 50 μA is applied to the MRAM device 20. Curve 1000 shows a magnetic field $H_x$ of 0 Oe. Symbol "$H_x$" represents that the magnetic field is along the x axis. Curve 1002 shows a magnetic field ($H_x$) of 100 Oe. Curve 1004 shows a magnetic field ($H_x$) of 300 Oe. Curve 1006 shows a magnetic field ($H_x$) of 500 Oe. Both the P to AP switching time and the AP to P switching time decrease as the magnetic field $H_x$ increases. FIG. 3C is a diagram showing a critical current ($I_c$) at write time of 10 ns and switching efficiency versus magnetic field ($H_x$) in P to AP switching of the MRAM device 20, in condition that the MTJ structure 10 of the MRAM device 20 has a diameter of about 35 nm. In FIG. 3C, curve 1008 shows the critical current ($I_c$) at write time of 10 ns versus time, and curve 1010 shows the switching efficiency at write time of 10 ns versus time. It is noted that the switching efficiency is proportional to a ratio of energy barrier and the critical current. The critical current of P to AP switching decreases as the magnetic field ($H_x$) increases, which in turn improves the switching efficiency of the MTJ structure 10. For example, by applying the magnetic field ($H_x$) of 500 Oe, the switching efficiency of P to AP of the MTJ structure 10 has an increased amount of about 35% as compared to that without applying the magnetic field ($H_x$).

Figure 4A:
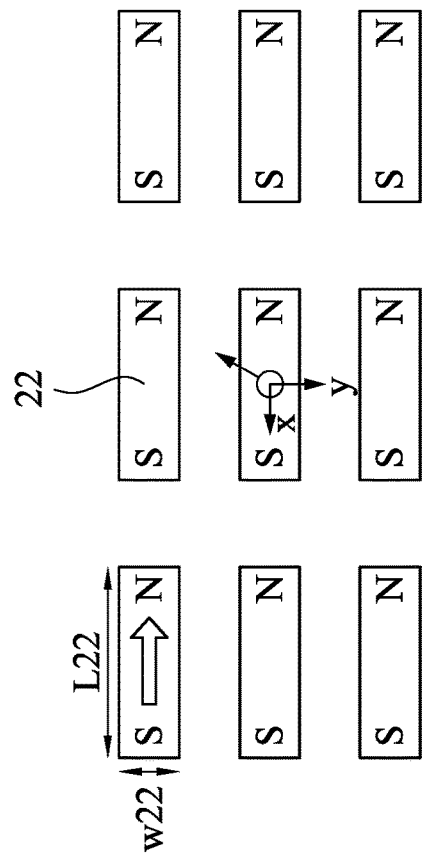
FIG. 4A shows a top view of a 3×3 magnetic array formed by magnetic field induced elements.
Figure 4B:
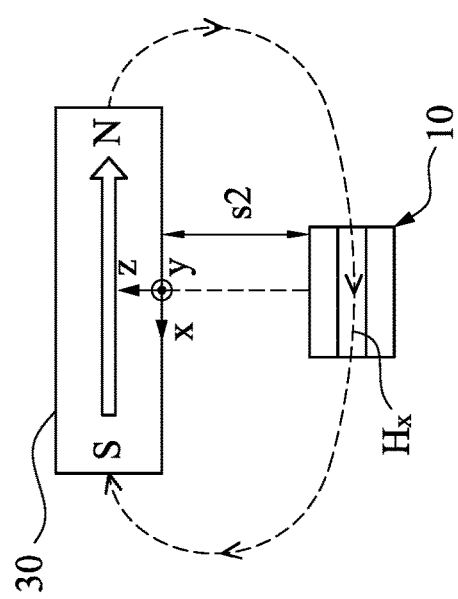
FIG. 4B showing a cross-sectional view of the memory device having a MTJ structure and the magnetic array on a top of the MTJ structure.
Figure 4C:
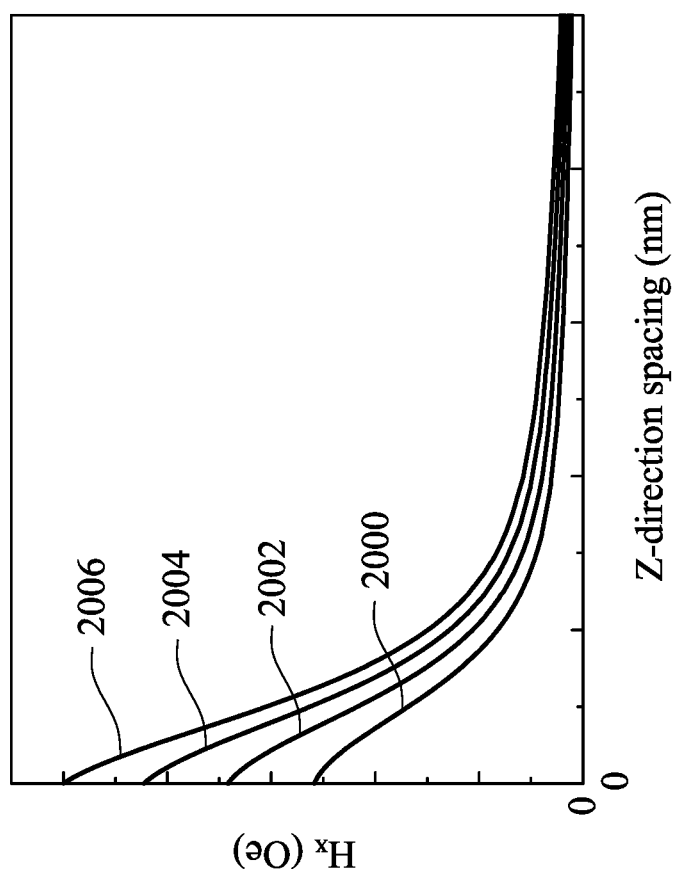
FIG. 4C shows a z-direction spacing dependence on the magnetic field ($H_x$).

FIG. 4A shows a top view of a 3×3 magnetic array 30 formed by magnetic field induced elements 22. FIG. 4B showing a cross-sectional view of the MRAM device 20' having a MTJ structure 10 and the magnetic array 30 on a top of the MTJ structure 10. For the sake of clarity, the magnetic array 30 is illustrated as a single one in FIG. 4B. The MTJ structure 10 and the magnetic array 30 have a z-direction spacing s2 therebetween. FIG. 4C shows a z-direction spacing dependence on the magnetic field ($H_x$). As shown in FIG. 4C, the magnetic field ($H_x$) increases as the z-direction spacing s1 decreases. In some embodiments, the magnetic induced elements have a length along the x axis of 390±5 nm and a width along the y-axis of 120±5 nm.

In FIG. 4C, curve 2000 shows a magnetic field ($H_x$) of the magnetic array 30 formed by the magnetic induced elements with a thickness of 30±2 nm. Curve 2002 shows a magnetic field ($H_x$) of the magnetic array 30 formed by the magnetic induced elements with a thickness of 40±2 nm. Curve 2004 shows a magnetic field ($H_x$) of the magnetic array 30 formed by the magnetic induced elements with a thickness of 50±2 nm. Curve 2006 shows a magnetic field ($H_x$) of the magnetic array 30 formed by the magnetic induced elements with a thickness of 60±2 nm. The magnetic field ($H_x$) of the magnetic array 30 increase as the thickness of the magnetic induced elements increases.

Figure 4D:
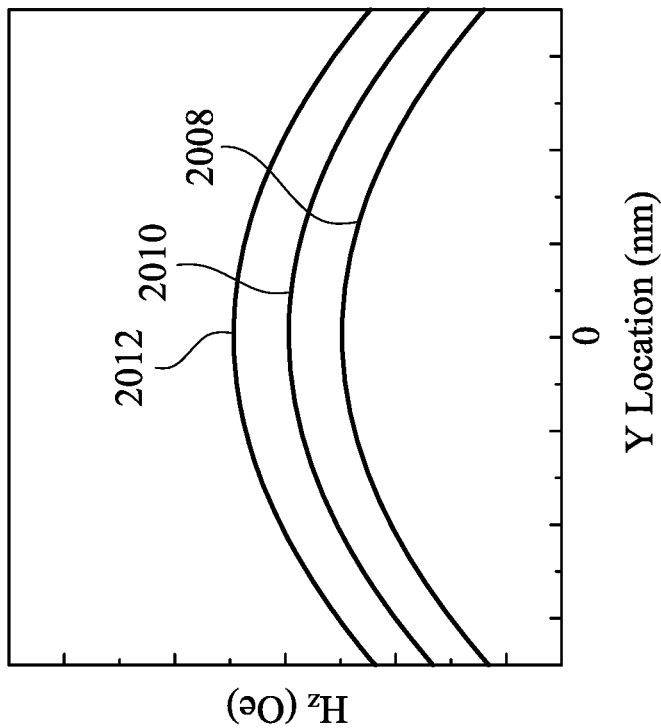
FIGS. 4D-4E are diagrams showing the magnetic field ($H_z$) in the free layer versus x location and y location of the free layer in the MTJ structure, respectively.
Figure 4E:
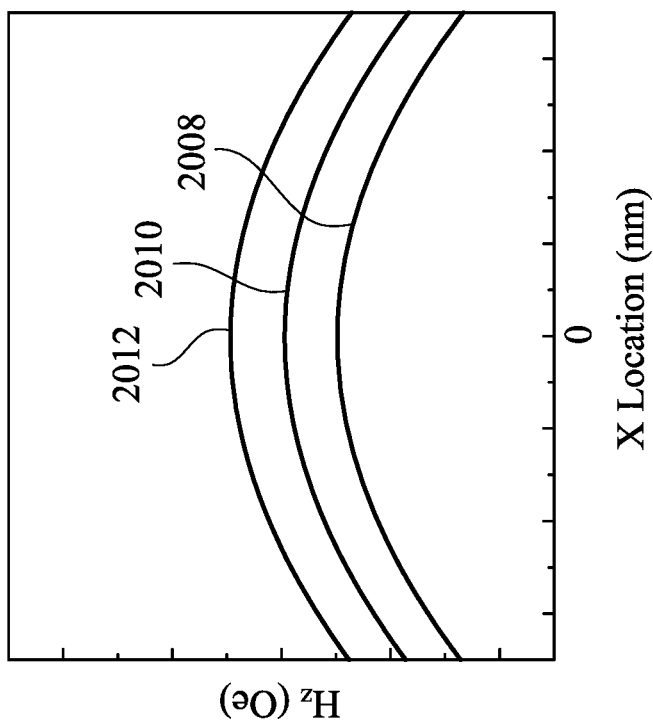

FIGS. 4D-4E are diagrams showing the magnetic field (Hz) in the free layer 16 with a thickness of about 2±0.2 nm in a MTJ structure 10 having a diameter of 35±2 nm versus x location and y location, respectively. Reference is made to FIGS. 4A, 4D and 4E. Curve 2008 shows the magnetic field (Hz) in condition that the z-direction spacing s2 of 25.2±0.1 nm. Curve 2010 shows the magnetic field (Hz) in condition that the z-direction spacing s2 of 26.2±0.1 nm. Curve 2012 shows the magnetic field (Hz) in condition that the z-direction spacing s2 of 27.2±0.1 nm. In FIGS. 4D-4E, the curves 2008, 2010, 2012 and 2014 have shallow slopes, representing that the magnetic field ($H_z$) provided by the magnetic array 30 has substantially uniform strength across the free layer 16 along the x axis and the y axis. For example, there is small variation (e.g., about 2.5%) of magnetic field ($H_z$) along both of the x axis and the y axis.

Figure 5B:
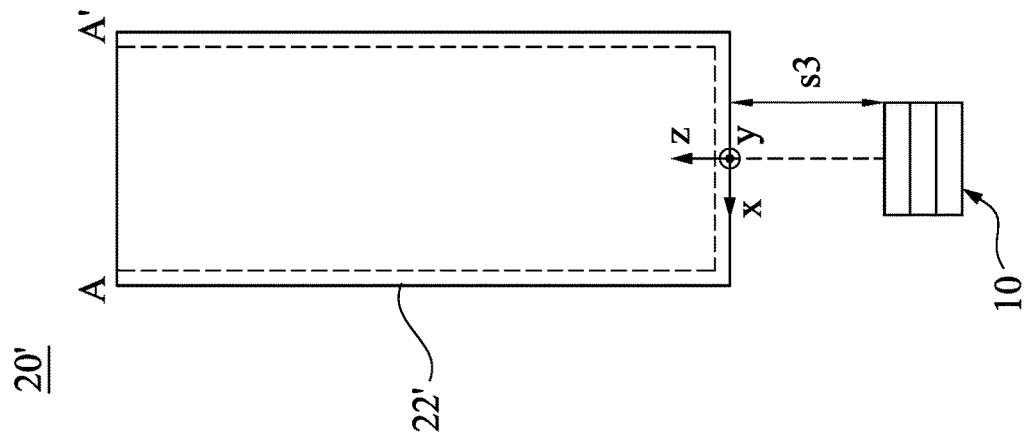
FIG. 5B illustrates a cross-sectional view of a MRAM device having a MTJ structure and the magnetic induced element over a top of the MTJ structure.
Figure 5A:
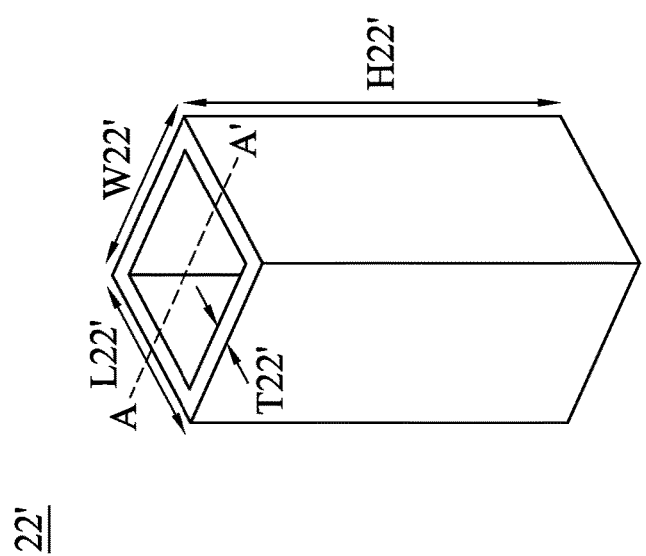
FIG. 5A is a perspective view of a magnetic induced element in accordance with some embodiments.
Figure 5D:
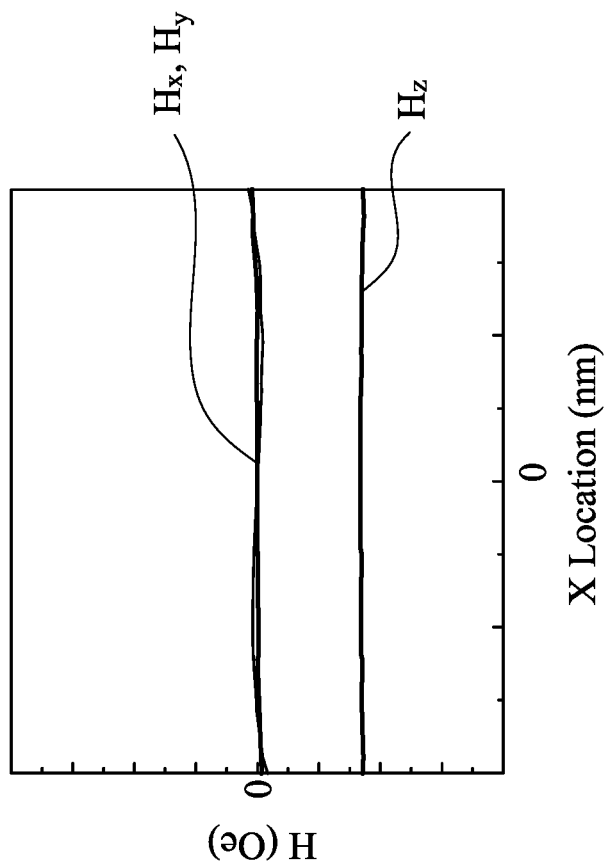
FIG. 5D is a diagram of magnetic fields ($H_x$, $H_y$, $H_z$) at a z-direction spacing of 10±1 nm versus x location of the MTJ structure.
Figure 5C:
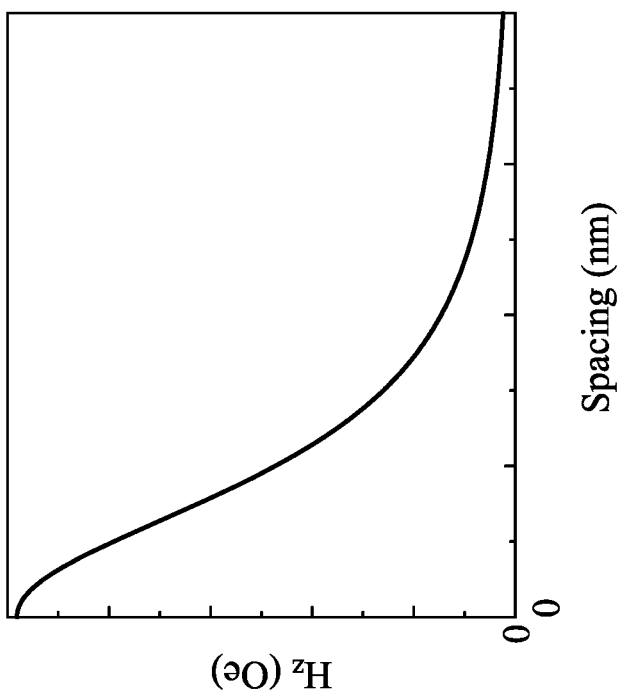
FIG. 5C is a diagram of z-direction spacing dependence on the magnetic field ($H_z$).

FIG. 5A is a perspective view of a magnetic induced element 22' in accordance with some embodiments. FIG. 5B illustrates a cross-sectional view of a MRAM device 20' having a MTJ structure 10 and the magnetic induced element 22' over a top of the MTJ structure 10. The magnetic induced element 22' has a height H22' greater than a width and a length of thereof. For example, the magnetic induced element 22' has a height H22' of about 100±5 nm, a width W22' of about 50±5 nm and a length L22' of about 50±5 nm. The magnetic induced element 22' and the MTJ structure 10 have a z-direction spacing s3 therebetween. FIG. 5C is a diagram of z-direction spacing dependence on the magnetic field ($H_z$). FIG. 5D is a diagram of magnetic fields ($H_x$, $H_y$, $H_z$) at a z-direction spacing s3 of 10±1 nm versus x location of the MTJ structure 10. As shown in FIG. 5C, the magnetic field ($H_z$) increases as the z-direction spacing s3 decreases. As shown in FIG. 5D, the magnetic field ($H_z$) provided by the magnetic induced element 22' has substantially uniform strength across the MTJ structure 10 along the x axis.

Figure 5E:
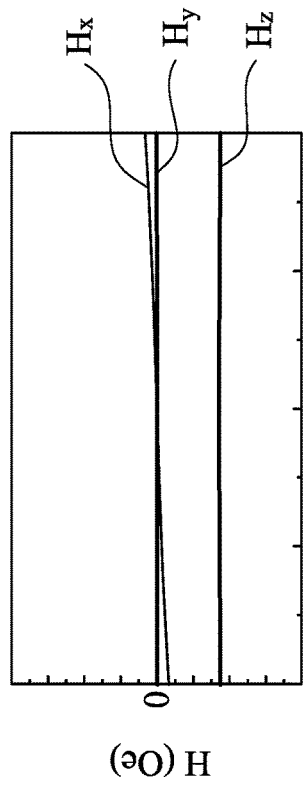
FIGS. 5E-5G are diagrams showing magnetic fields ($H_x$, $H_y$, $H_z$) at a z-direction spacing of 10±1 nm versus x location of the MTJ structure.
Figure 5F:
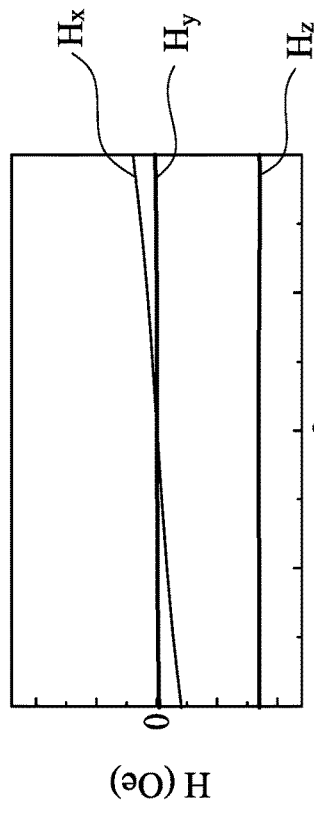
Figure 5G:
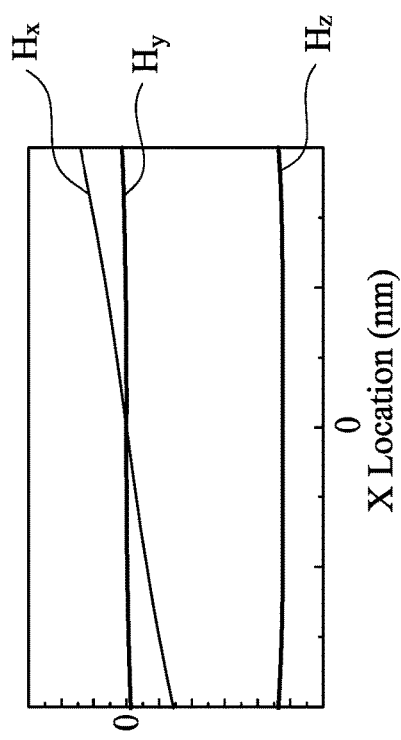

FIGS. 5E-5G are diagrams showing magnetic fields ($H_x$, $H_y$, $H_z$) at a z-direction spacing of 10±1 nm versus x location of the MTJ structure 10. Referring back to FIG. 5A, the magnetic induced element 22' is hollow and has a cavity therein. FIGS. 5E-5G shows diagrams of the magnetic induced element 22' having a thickness T22' of 5±0.2 nm, 10±0.2 nm, and 15±0.2 nm, respectively. In FIGS. 5E-5G, the magnetic fields ($H_z$) provided by the magnetic induced elements 22' have substantially uniform strength across the MTJ structure 10. The magnetic fields ($H_z$) are increased as the thickness of the magnetic induced element increases. For example, in FIG. 5E, the magnetic field ($H_z$) is about −85.5±5 Oe. In FIG. 5F, the magnetic field ($H_z$) is about −421 Oe. In FIG. 5E, the magnetic field ($H_z$) is about −1190±5 Oe.

FIGS. 6A-6B show perspective views of a memory device 20" including a MTJ structure 10 and a 3×3 magnetic array 30' formed by magnetic field induced elements 22" over a top of the MTJ structure 10 in accordance with some other embodiments. For the sake of clarity, the magnetic array 30"

is illustrated as a single one in FIG. 6B. Each of the magnetic field induced elements 22" has an x-direction spacing dx of 216±5 nm and a y-direction spacing dy of 225±5 nm. The MTJ structure 10 and the magnetic array 30" have a z-direction spacing s4 therebetween. The difference between the magnetic field induced elements 22" and the magnetic field induced elements in FIG. 5A is that the magnetic field induced elements 22" are solid.

Figure 6C:
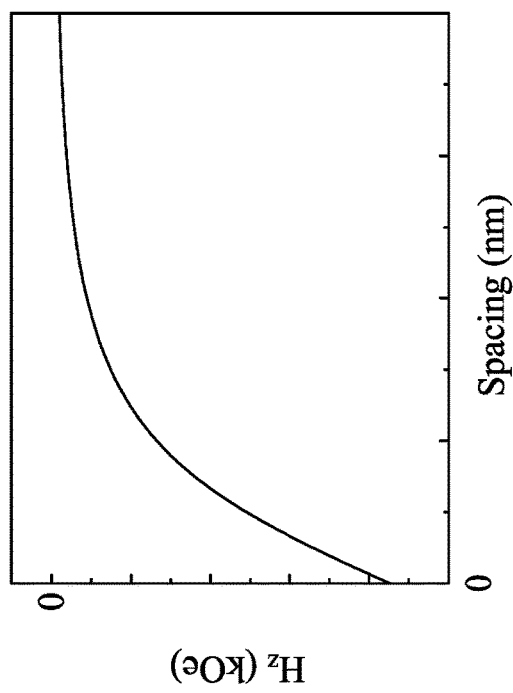
FIG. 6C shows a diagram of magnetic field ($H_z$) versus a z-direction spacing from the magnetic array.
Figure 6D:
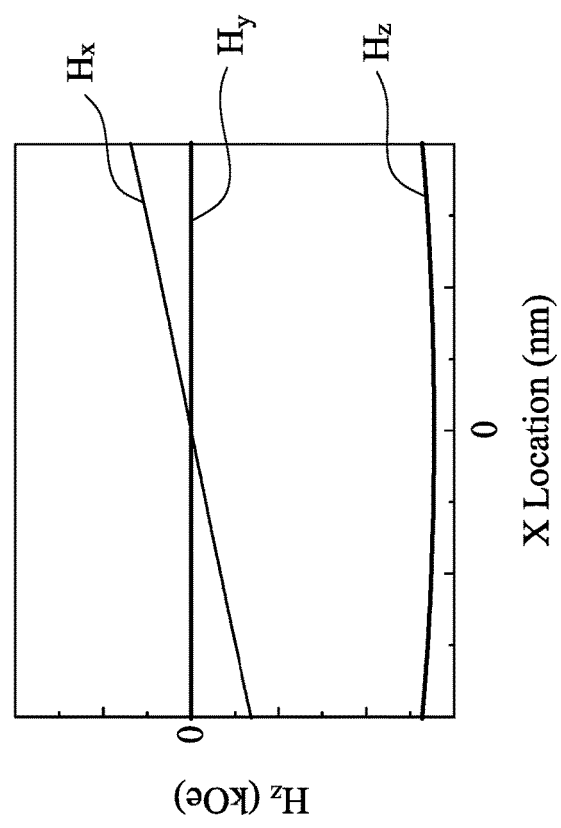
FIG. 6D shows a diagram of magnetic field ($H_x$, $H_y$, $H_z$) at a z-direction spacing of 10±0.5 nm from the magnetic array versus x location of the MTJ structure.

FIG. 6C shows a diagram of magnetic field ($H_z$) versus a z-direction spacing from the magnetic array 30". FIG. 6D shows a diagram of magnetic field ($H_x$, $H_y$, $H_z$) at a z-direction spacing of 10±0.5 nm from the magnetic array 30" versus x location of the MTJ structure 10. In FIG. 6C, the magnetic field ($H_z$) increases as the z-direction spacing s4 (see FIG. 6B) increases. In FIG. 6D, the magnetic field ($H_z$) provided by the magnetic array 30" has substantially uniform strength across the MTJ structure 10.

Figure 7A:
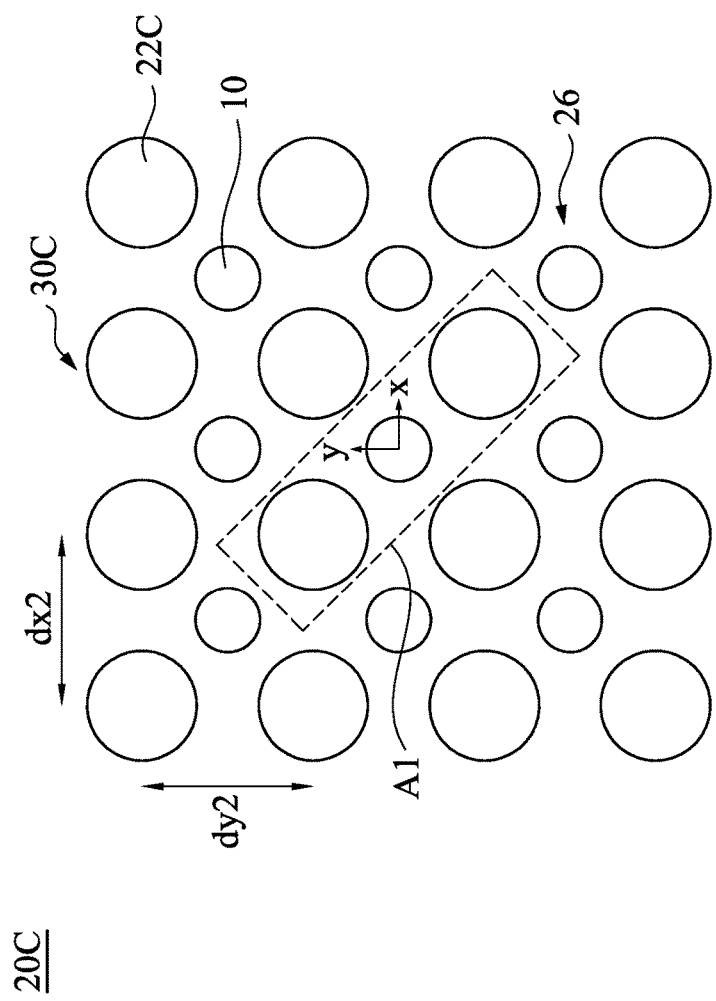
FIG. 7A shows a top view of a 3×3 array of MTJ structures and a 4×4 magnetic array formed by magnetic field induced elements.
Figure 7B:
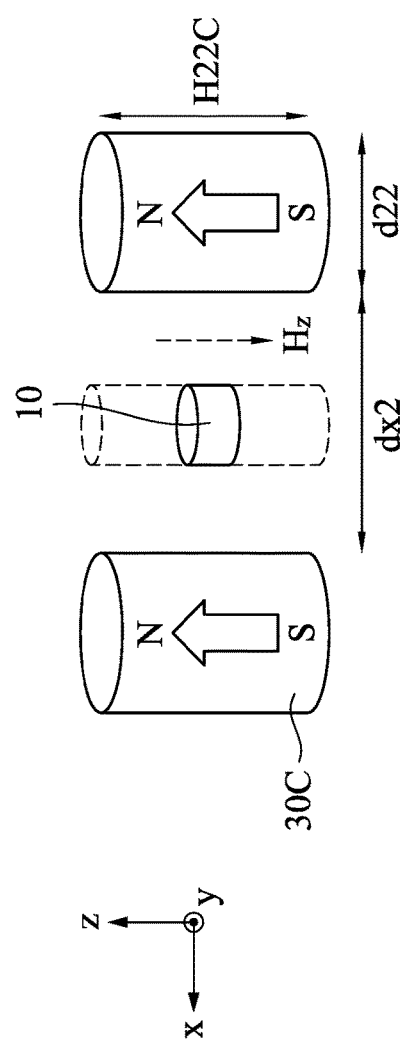
FIG. 7B shows a partial perspective view of FIG. 7A.

FIG. 7A shows a top view of a 3×3 array 26 of MTJ structures 10 and a 4×4 magnetic array 30C formed by magnetic field induced elements 22C. FIG. 7B shows a partial perspective view of FIG. 7A. For example, FIG. 7B is a perspective view of a region A1, showing two magnetic field induced elements 22C and one MTJ structure 10 disposed therebetween. The magnetic array 30C can provide a magnetic field ($H_z$). Each of the magnetic field induced elements 30C has an x-direction spacing dx2 of 216±2 nm and a y-direction spacing dy2 of 225±2 nm. The MTJ structure 10 may have a diameter of 35±2 nm. The magnetic field induced elements 22C have a height H2CC of 100±2 nm and a diameter d22 of 50±2 nm.

Figure 7C:
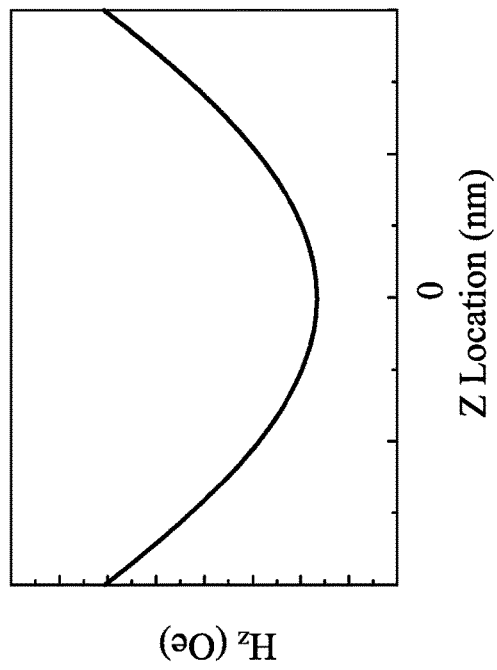
FIG. 7C is a diagram showing magnetic field ($H_z$) versus z location of the MTJ structure.

FIG. 7C is a diagram showing magnetic field ($H_z$) versus z location of the MTJ structure. In FIG. 7C, the curve has a shallow slope, representing that the magnetic field ($H_z$) provided by the magnetic array 30C has substantially uniform strength across the free layer 16 along the z axis. For example, the magnetic field ($H_z$) is −300±5 Oe at a z-direction spacing s4 of −26.2±2 nm.

Figure 7D:
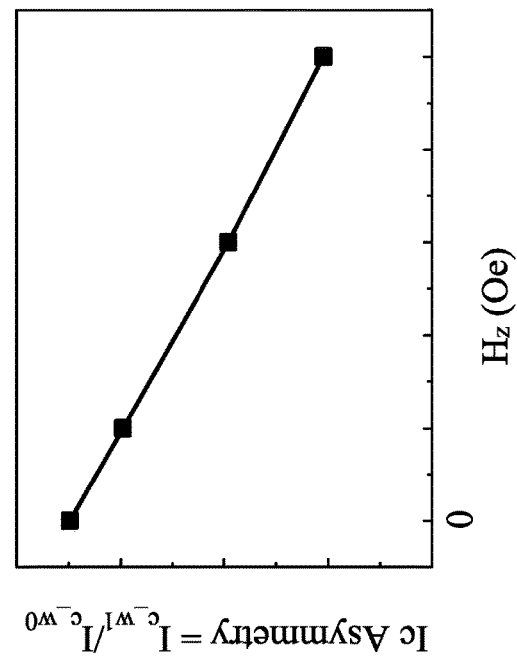
FIG. 7D is a diagram showing magnetic field ($H_z$) versus critical current ($I_c$) asymmetry.

FIG. 7D is a diagram showing magnetic field ($H_z$) versus critical current ($I_c$) asymmetry, which refers to a ratio of critical current of P to AP switching and critical current of AP to P switching. In FIG. 7D, the critical current ($I_c$) asymmetry decreases as the magnetic field ($H_z$) increases. That is, the critical current ($I_c$) asymmetry can be mitigated by the increased magnetic field ($H_z$).

Figure 7E:
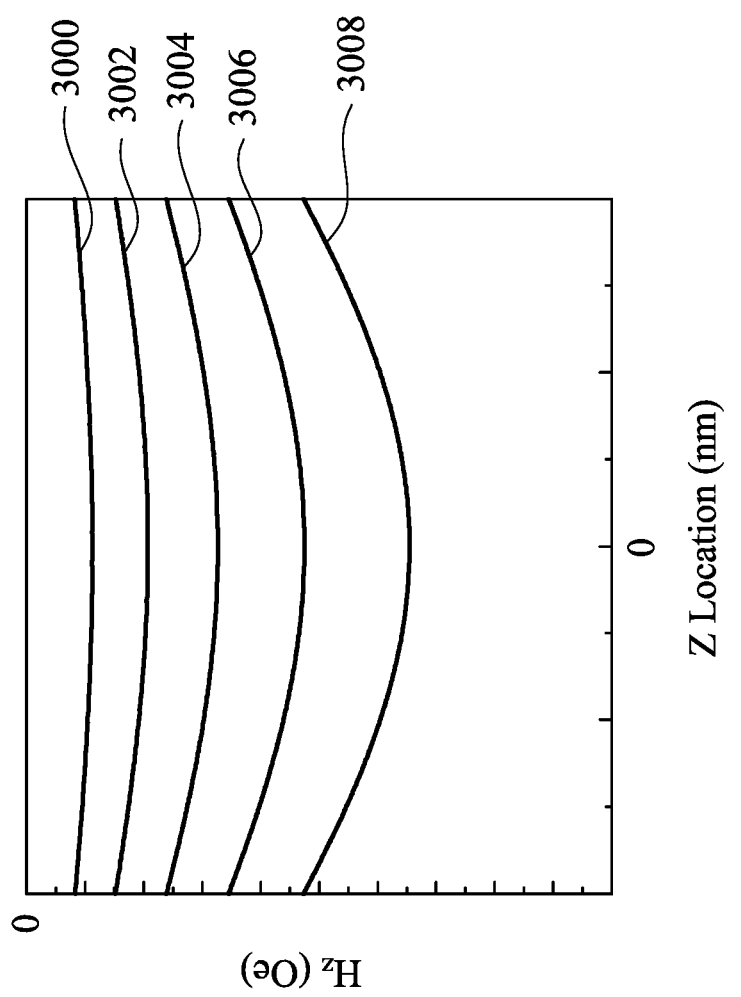
FIG. 7E is a diagram showing magnetic field ($H_z$) versus z location of the MTJ structure in accordance with some embodiments.

FIG. 7E is a diagram showing magnetic field ($H_z$) versus z location of the MTJ structure in accordance with some embodiments. Curve 3000 shows a magnetic field ($H_z$) provided by a magnetic field induced element 22C with a diameter of 30±0.2 nm. Curve 3002 shows a magnetic field ($H_z$) provided by a magnetic field induced element 22C with a diameter of 40±0.2 nm. Curve 3004 shows a magnetic field ($H_z$) provided by a magnetic field induced element 22C with a diameter of 50±0.2 nm. Curve 3006 shows a magnetic field ($H_z$) provided by a magnetic field induced element 22C with a diameter of 60±0.2 nm. Curve 3008 shows a magnetic field ($H_z$) provided by a magnetic field induced element 22C with a diameter of 70±0.2 nm. In FIG. 7E, the magnetic field ($H_z$) increase as the diameter of the magnetic field induced elements 22C increase.

Figure 8B:
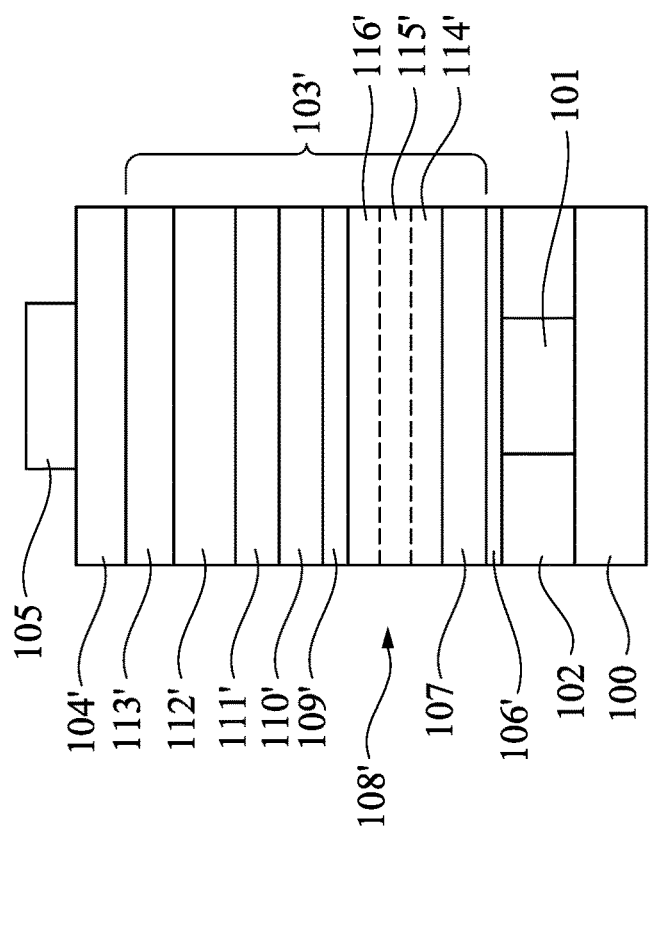
FIG. 8B is a cross-sectional view along line A-A' in FIG. 8A.
Figure 8A:
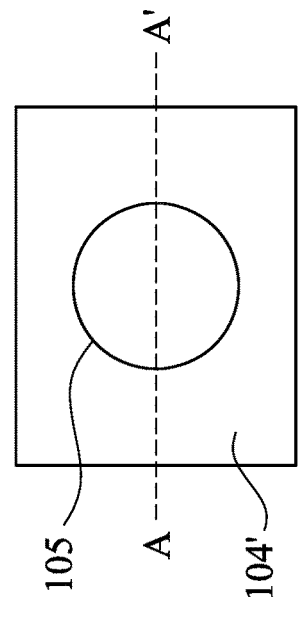
FIG. 8A is a top view of a memory device undergoing a method of fabrication according to various aspects of the present disclosure.

FIG. 8A is a top view of a memory device M100 undergoing a method of fabrication according to various aspects of the present disclosure. FIGS. 9-17 are cross-sectional views of the memory device M100 taken along a cross-sectional plane A-A' at various points in a method of fabrication according to various aspects of the present disclosure. FIG. 8B is a cross-sectional view along line A-A' in FIG. 8A. FIGS. 9-17 are cross-sectional views of the memory device M100 at various stages according to various aspects of the present disclosure. Referring to FIGS. 8A-8B, a dielectric layer 102 is formed on a substrate 100. The dielectric layer 102 may have a thickness in a range from 1 nm to 1 μm. A chemical-mechanical polish (CMP) process is optionally performed to the dielectric layer 102, until a desirable thickness is achieved. The dielectric layer 102 can be, for example, silicon dioxide layer, silicon carbide layer, silicon nitride layer, silicon oxycarbide layer, silicon oxynitride layer, low-k dielectric (e.g., having a dielectric constant of less than about 3.9) layer, extreme low-k (ELK) dielectric (e.g., having a dielectric constant of less than about 2.5) layer, the like, or combinations thereof.

A bottom electrode via (BEVA) 101 is formed within the dielectric layer 102. An exemplary formation method of the BEVA 101 includes etching an opening in the dielectric layer 102, forming a diffusion tunnel barrier layer lining the opening and then filling a filling metal in a recess in the diffusion tunnel barrier layer, and performing a planarization process, such as a CMP process, to remove excess materials of the diffusion tunnel barrier layer and the filling metal outside the dielectric layer 102. Formation of the filling metal and the diffusion tunnel barrier layer may be exemplarily performed using chemical vapor deposition (CVD), atomic layer deposition (ALD), physical vapor deposition (PVD), the like, and/or a combination thereof. The remaining filling metal and the diffusion tunnel barrier layer in the dielectric layer 102 can serve as the BEVA 101. In some embodiments, the BEVA 101 serves as a terminal of the bottom electrode that is electrically coupled to a source line through a transistor, thereby implementing the circuit as illustrated in FIG. 2D. In some embodiments, the BEVA 101 includes TiN, Ru, Ta or the like.

The dielectric layer 102 may be formed by acceptable deposition techniques, such as CVD, ALD, PVD, the like, and/or a combination thereof and has a thickness in a range from 1 nm to 1 μm. A bottom electrode layer 106' is formed on the dielectric layer 102 and the BEVA 101. In some embodiment, the bottom electrode layer 106' may include Ta, TaN, W, Ru, TiN or the like and has a thickness in a range from 1 nm to 1 μm, for example, from 1 nm to 50 nm. MTJ layers 103' are formed on the bottom electrode layer 106'. The MTJ layers 103' includes a seed layer 107', a pinned layer 108', a spacer 109', a reference layer 110', a tunnel barrier layer 111', a free layer 112' and a capping layer 113' stacked in sequence from bottom to up formed by suitable film formation methods, which include physical vapor deposition (PVD) including sputtering, molecular beam epitaxy (MBE), pulsed laser deposition (PLD), atomic layer deposition (ALD), electron beam (e-beam) epitaxy, chemical vapor deposition (CVD), or derivative CVD processes further including low pressure CVD (LPCVD), ultrahigh vacuum CVD (UHVCVD), reduced pressure CVD (RPCVD), electro plating, or any combinations thereof. In some embodiments, the seed layer 107' may include Pt, Ta, Ru or the like and has a thickness in a range from 1 nm to 50 nm.

In some embodiments, the pinned layer 108' may be a synthetic anti-ferroelectric (SAF) formed by a tri-layer structure formed by $[Co/Pt]_N$ multilayer 114', a synthetic anti-ferromagnetic (SAF) spacer 115' and $[Co/Pt]_N$ multilayer 116'. In some embodiments, the $[Co/Pt]_N$ multilayer 114' and the $[Co/Pt]_N$ multilayer 116' each has a thickness in a range from 0.1 nm to 100 nm, for example, from 0.1 nm to 50 nm. The cycle number (N) of the two $[Co/Pt]_N$ multilayers 114', 116' may be 1 to 10. In some embodiments, the SAF spacer 115' has a thickness in a range from 0.1 nm to 100 nm, for example, from 0.1 nm to 10 nm. In some other embodiments, the SAF spacer 115' has a thickness in a range from 0.1 nm to 5 nm. The SAF spacer 115' may include Ru, Ir, or the like.

In some embodiments, the spacer 109' may include Ta, W, Mo, or the like and have a thickness in a range from 0.1 nm to 1 nm. In some embodiments, the reference layer 110' may include CoFeB, CoFe, FeB, Fe or the like and has a thickness in a range from 0.1 nm to 5 nm. In some embodiments, the tunnel barrier layer 111' may include MgO and has a thickness in a range from 0.1 nm to 10 nm. In some embodiments, the free layer 112' may be Co, Fe, CoFeB, CoFeB/spacer/CoFeB tri-layer, or the like. In some embodiments, the capping layer 113' may include MgO, Ta, W, Mo, Ru or the like. As discussed previously with regard to FIGS. 2A-2B, the reference layer 110 has a fixed magnetization direction, and the free layer 112 has a switchable magnetization direction.

A top electrode layer 104' is formed on the MTJ layers 103'. The top electrode layer 104' may include Ta, TiN, Ru, or the like and has a thickness in a range from 1 nm to 1 μm, for example, 10 nm to 500 nm. A patterned photoresist 105 is formed on the top electrode layer 104'. For example, a resist layer is formed over the top electrode layer 104' and then patterned into the patterned photoresist 105 using a suitable photolithography process such that portions of the top electrode layer 104' are exposed by the patterned photoresist 105. An exemplary photolithography process may include photoresist coating (e.g., spin-on coating), soft baking, mask aligning, exposure, post-exposure baking, developing the photoresist, rinsing, drying (e.g., hard baking), other suitable processes, or combinations thereof.

Figure 9:
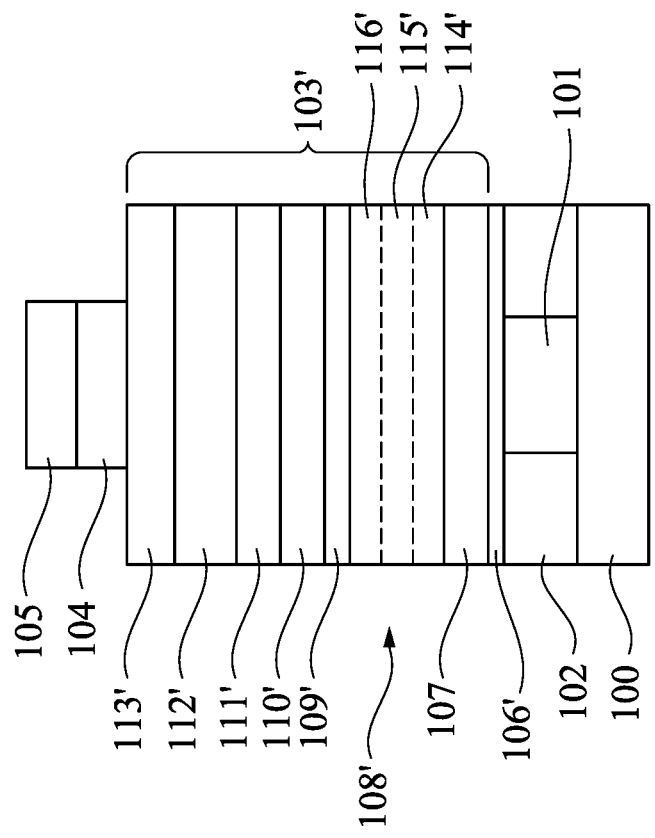
FIGS. 9-17 are cross-sectional views of the memory device taken along a cross-sectional plane A-A' at various points in a method of fabrication according to various aspects of the present disclosure.

Referring to FIG. 9, the top electrode layer 104' is patterned using the patterned photoresist 105 as an etch mask. The remaining portion of the top electrode layer 104' can be referred to as a top electrode 104. The top electrode 104 can serve as a masking layer for patterning underlying MTJ materials in subsequent processing. The patterned photoresist 105 is then removed using suitable processes such as ashing and/or etching.

Figure 10:
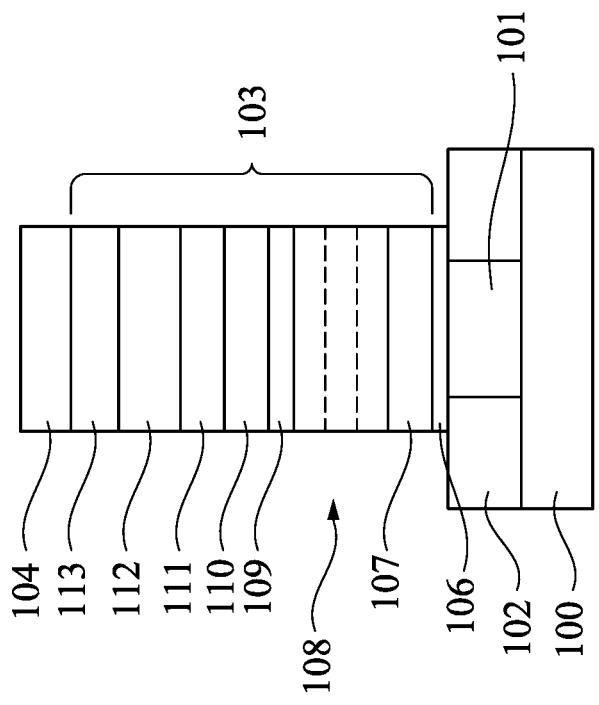

Referring to FIG. 10, the MTJ layers 103' is patterned using the top electrode 104 as an etch mask. A portion of the dielectric layer 102 is exposed after patterning the MTJ layers 103'. The remaining portion of the MTJ layers 103' can be referred to as a MTJ stack 103. For example, the MTJ stack 103 includes a seed layer 107, a pinned layer 108, a spacer 109, a reference layer 110, a tunnel barrier layer 111, a free layer 112 and a capping layer 113. In some embodiments, the geometry of the MTJ stack 103 can be circular, elliptical, rectangular, square, and with or without rounded corners. In some embodiments, the MTJ stack 103 may have a junction size of 1 nm to 1 μm. In some embodiments, the capping layer 113, the free layer 112, the reference layer 110 and the seed layer 107 may have a thickness in a range from 0.1 nm to 100 nm. In some embodiments, the tunnel barrier layer 111 and the spacer 109 may have a thickness in a range from 0.1 nm to 10 nm.

Figure 11:
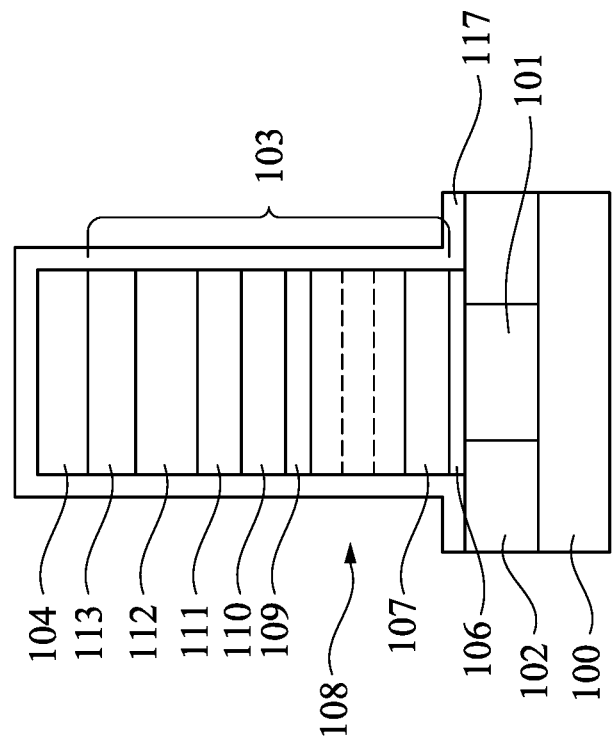
Figure 12:
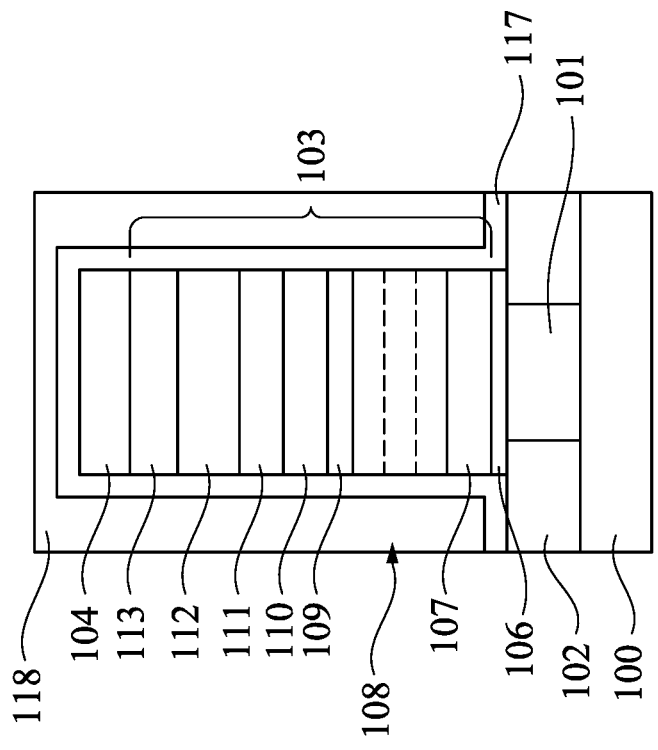

Referring to FIG. 11, an encapsulating layer 117 encapsulates the bottom electrode 106, the MTJ stack 103 and the top electrode 104. In some embodiments, the encapsulating layer 117 includes SiN, or the like, and has a thickness in a range from 1 nm to 50 nm.

A first interlayer dielectric (ILD) layer 118 is formed on the encapsulating layer 117 and surrounds the MTJ stack 103. In some embodiments, the first ILD layer 118 may have the same material as the dielectric layer 102. In some other embodiments, the first ILD layer 118 may have a different material than the dielectric layer 102. In some embodiments, the first ILD layer 118 includes silicon oxide, fluorinated silica glass (FSG), carbon doped silicon oxide, tetra-ethyl-ortho-silicate (TEOS) formed oxide, phosphosilicate glass (PSG), borophosphosilicate glass (BPSG), Black Diamond® (Applied Materials of Santa Clara, Calif.), amorphous fluorinated carbon, low-k dielectric material, the like or combinations thereof. A planarization process, such as a CMP process, is performed to remove excess materials of the first ILD layer 118. The first ILD layer 118 has a thickness in a range from 10 nm to 500 nm.

Figure 13:
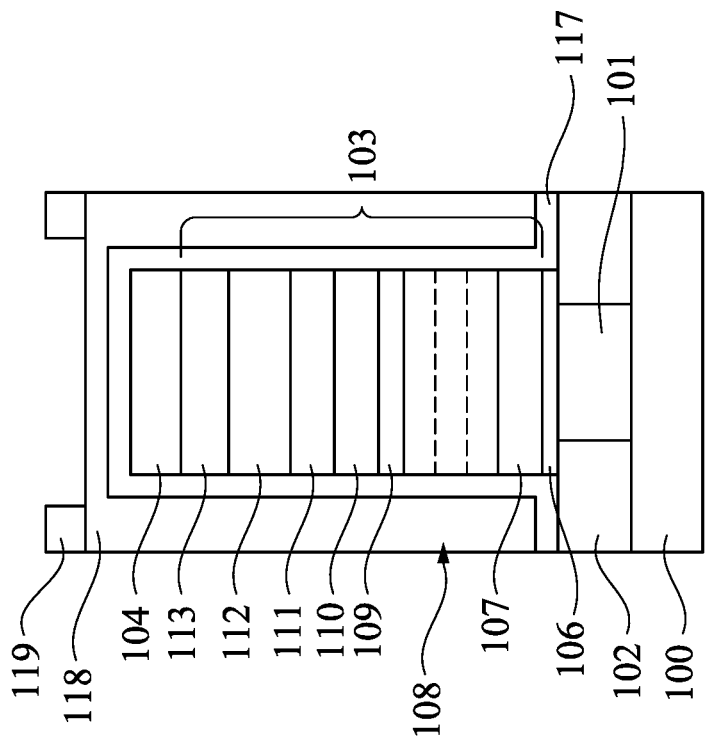

Referring to FIG. 13, a patterned photoresist 119 is formed on the first ILD layer 118. For example, a resist layer is formed over the first ILD layer 118 and then patterned into the patterned photoresist 119 using a suitable photolithography process such that portions of the first ILD layer 118 is exposed by the patterned photoresist 119. An exemplary photolithography process may include photoresist coating (e.g., spin-on coating), soft baking, mask aligning, exposure, post-exposure baking, developing the photoresist, rinsing, drying (e.g., hard baking), other suitable processes, or combinations thereof.

Figure 14:
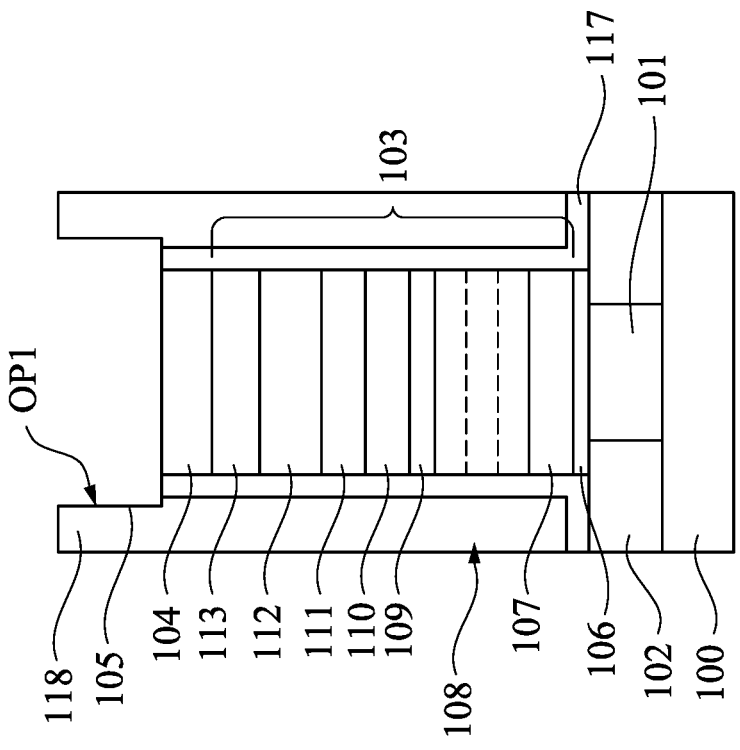

Referring to FIG. 14, an etching process is performed to form an opening OP1 penetrating through the first ILD layer 118 and the encapsulating layer 117, thereby exposing the top electrode 104.

Figure 15:
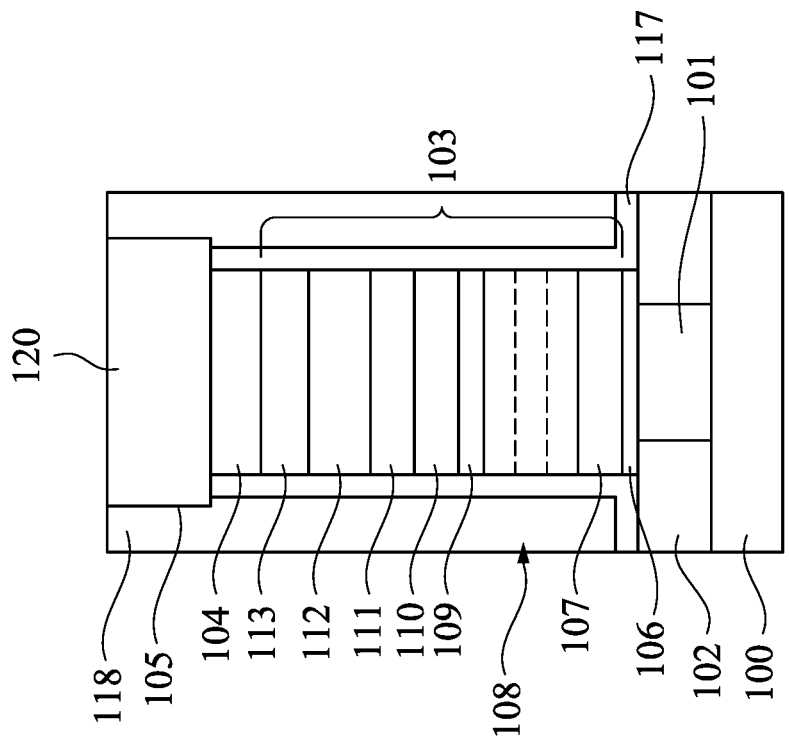
Figure 15:
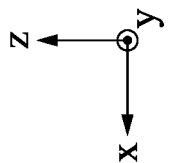

Referring to FIG. 15, a conductive line 120 is deposited on the first ILD layer 118 and fills into the opening OP1. A planarization process, such as a CMP process, is performed to remove excess materials of the conductive line 120. The remaining portion of the conductive line 120 function as a bit line and has a thickness in a range from 10 nm to μm. In some embodiments, the conductive line 120 includes copper, cobalt, or the like. The conductive line 120 is in contact with the top electrode 104. In some embodiments, the conductive line 120 functions as a bit line of MRAM cells.

Figure 16:
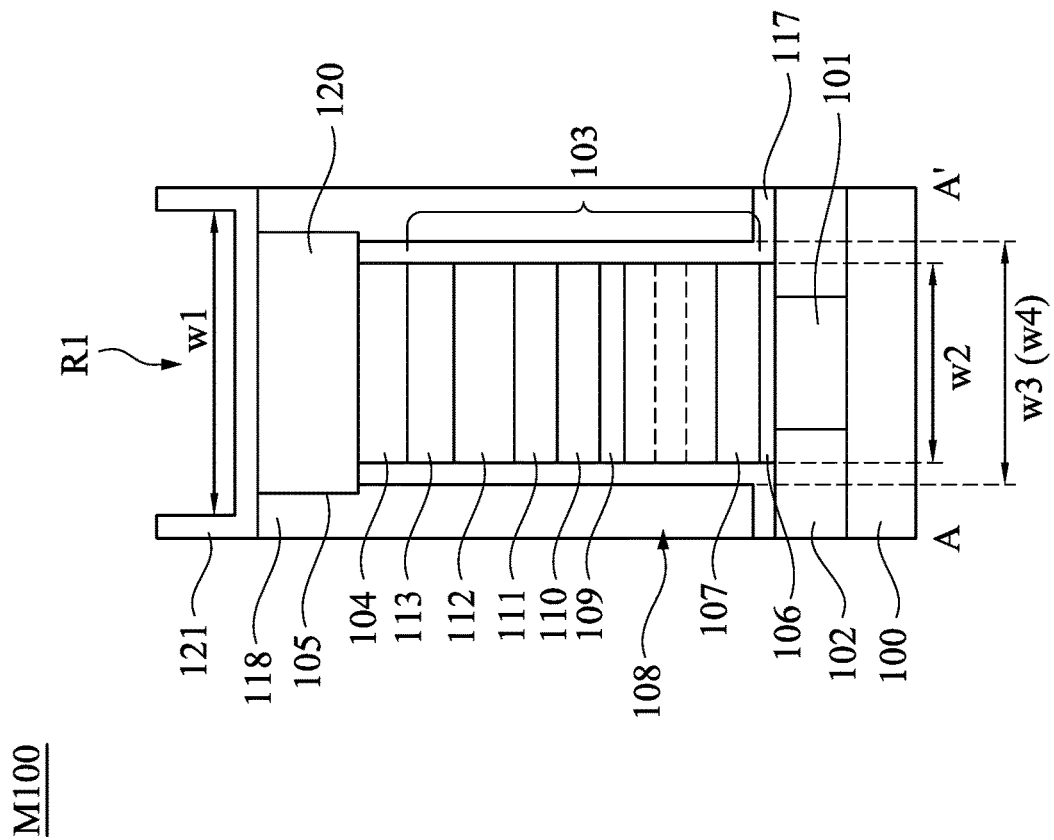
Figure 16:
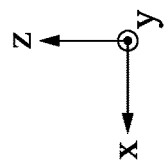

Referring to FIG. 16, a second interlayer dielectric (ILD) layer 121 is deposited on the conductive line 120 and the first ILD layer 118. An etching process is performed to the second ILD layer 121 to form a recess R1 in the second ILD layer 121. The recess R1 has a width w1 greater than a width w2 of the conductive line 120, a width w3 of the top electrode 104 and a width w4 of the MTJ stack 103. For example, the recess R1 has a bottom width greater than a top width of the top electrode 104 and a top width of the MTJ stack 103. The recess R1 is defined by sidewalls and an upper surface of the second ILD layer 121.

Figure 17:
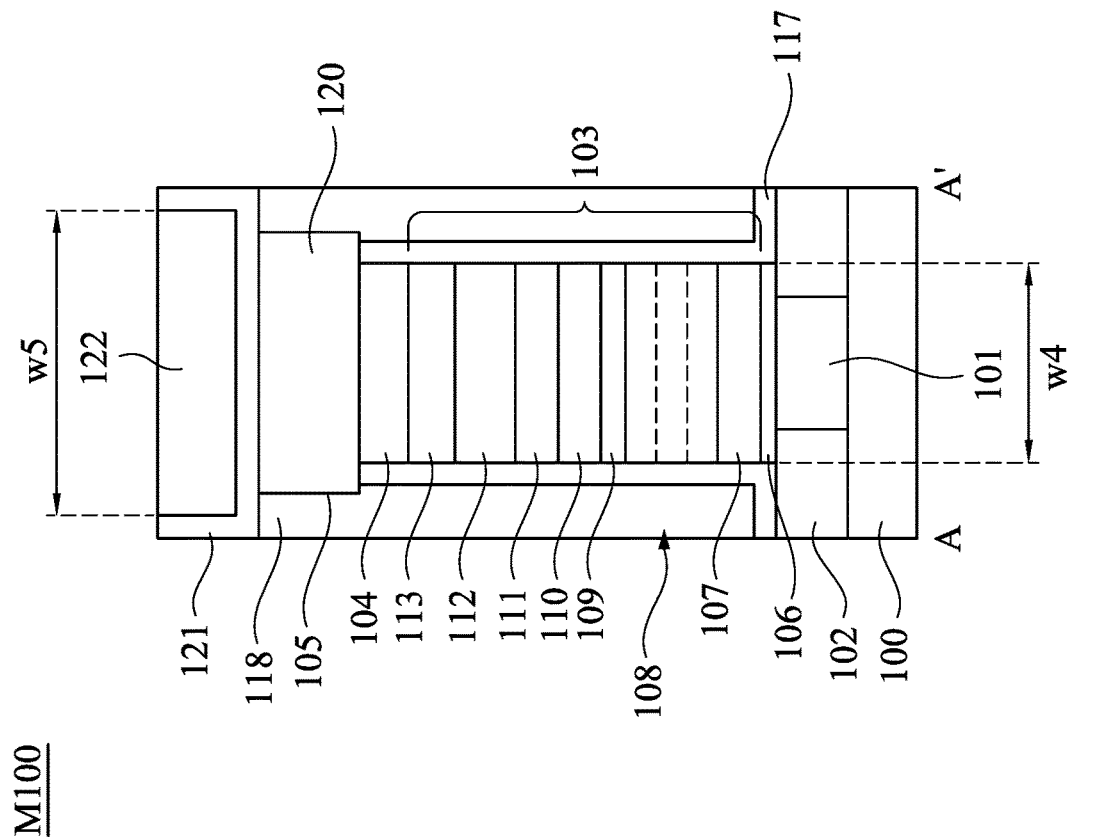

Referring to FIG. 17, a ferromagnetic metal 122 is deposited on the second ILD layer 121 and fills into the recess R1. A planarization process, such as a CMP process, is performed to remove excess materials of the ferromagnetic metal 122. In this embodiment, the ferromagnetic metal 122 is on a top of the top electrode 104 and spaced apart from the top electrode 104 and the MTJ stack 103 by the second ILD layer 121. In some embodiments, the ferromagnetic metal 122 has a thickness in a range from 1 nm to 100 nm. The ferromagnetic metal 122 may include Fe/Co-based alloy, CoFeB, CoFe, FeB, Fe, Co, or the like. The ferromagnetic metal 122 is referred to as a magnetic field induced element, which can provide a magnetic field having magnetic field lines radiate from the north pole to the south pole, as discussed previously with regard to FIG. 2C. In other words, the ferromagnetic metal 122 exerts a magnetic field on the MTJ stack 103. For example, the magnetic field provided by the ferromagnetic metal 122 is along the x-axis. Due to the width w1 of the recess R1 (see FIG. 16) being greater than the width w3 of the MTJ stack 103, the ferromagnetic metal 122 can have a width w5 greater than the width w3 of the MTJ stack 103. As a result, the ferromagnetic metal 122 can provide sufficient magnetic field to effectively increase an initial torque of the free layer 112. In some embodiments, the magnetization direction of the ferromagnetic metal 122 can be set by an external magnetic field that is applied during or after depositing the ferromagnetic metal 122.

Figure 18A:
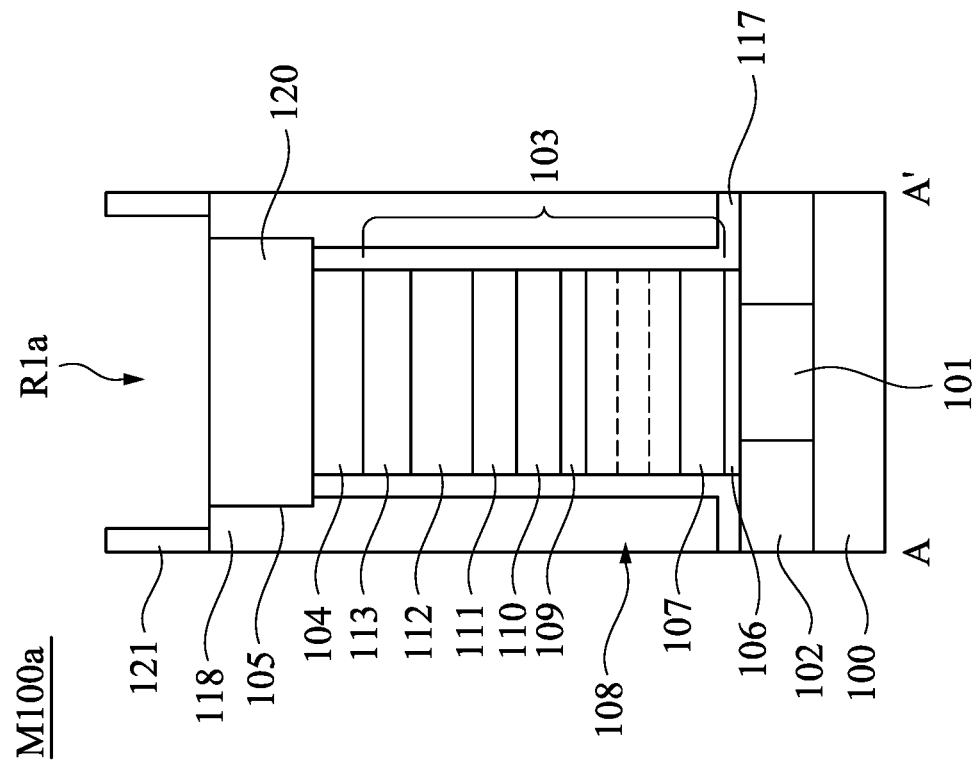
FIGS. 18A-18B are cross-sectional views of a memory device with an alternative ferromagnetic metal configuration taken along the cross-sectional plane A-A' according to various aspects of the present disclosure.
Figure 18B:
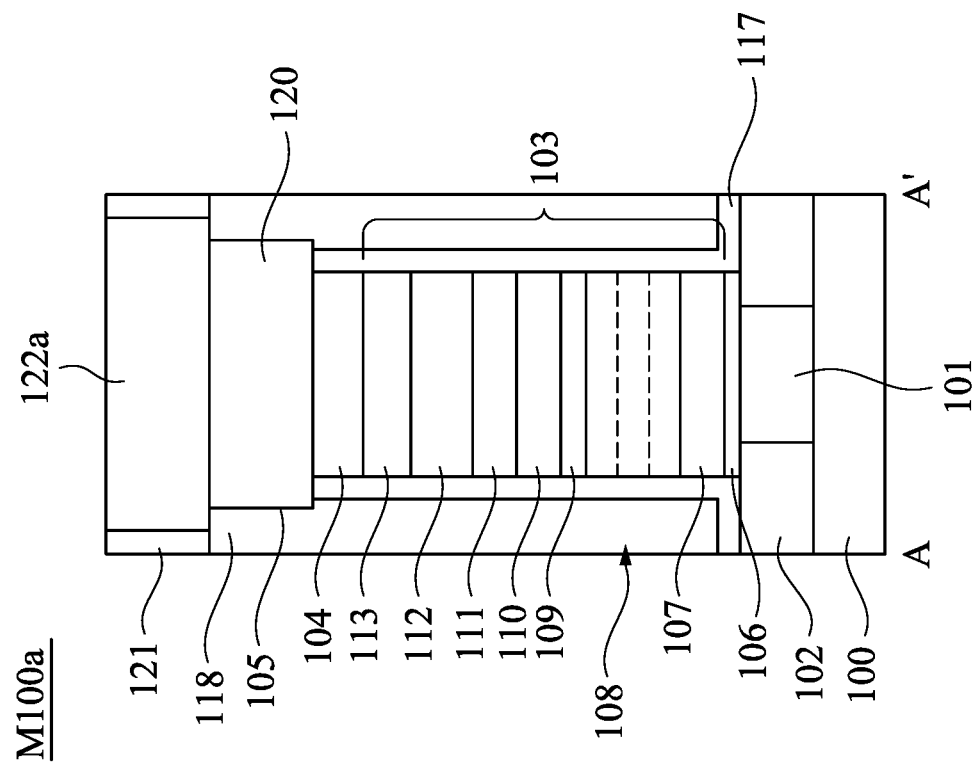
Figure 18B:
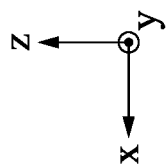

FIGS. 18A-18B are cross-sectional views of a memory device M100a with an alternative ferromagnetic metal configuration taken along the cross-sectional plane A-A' according to various aspects of the present disclosure. The difference between the memory device M100a in FIG. 18A and the memory device M100 in FIG. 16 is that the recess R1a in the second ILD layer 121 penetrating through the second ILD layer to expose the conductive line 120. A portion of the first ILD layer 118 is exposed to the recess R1a. For example, the recess R1a is defined by sidewalls of the second ILD layer 121, an upper surface of the first ILD layer 118 and a top surface of the conductive line 120. Afterwards, a ferromagnetic metal 122a is deposited on the second ILD layer 121 and fills into the recess R1a, as shown in FIG. 18B. A planarization process, such as a CMP process, is performed to remove excess materials of the ferromagnetic metal 122a. In this embodiment, the ferromagnetic metal 122a is in contact with the conductive line 120 and is embedded in the second ILD layer 121.

Figure 19:
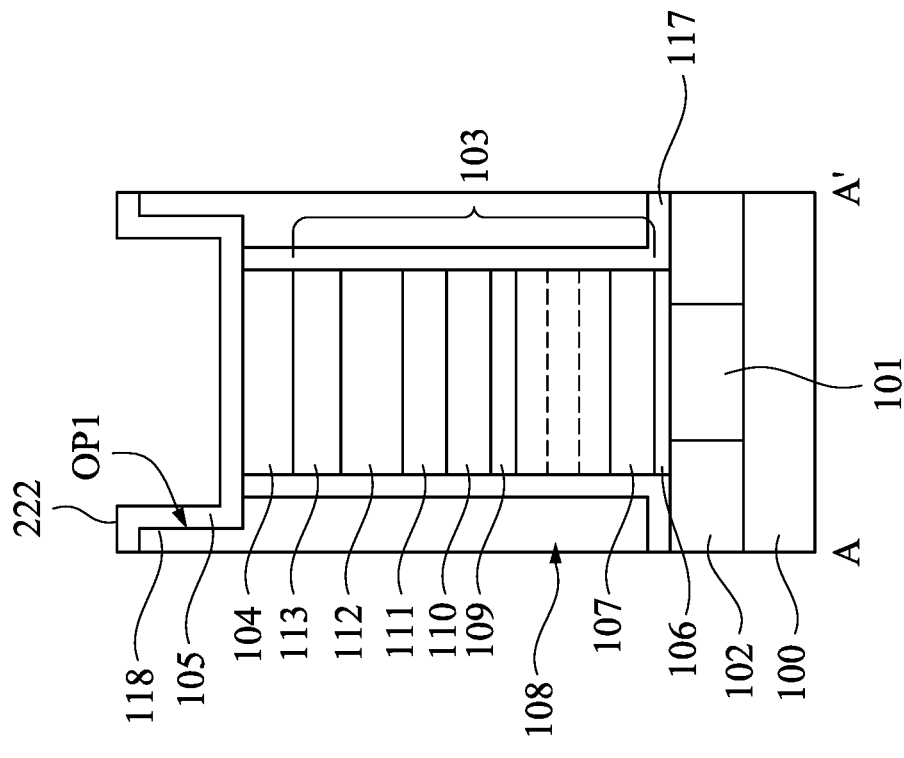
FIGS. 19-20 are cross-sectional views of a memory device with an alternative ferromagnetic metal configuration taken along the cross-sectional plane A-A' according to various aspects of the present disclosure.
Figure 20:
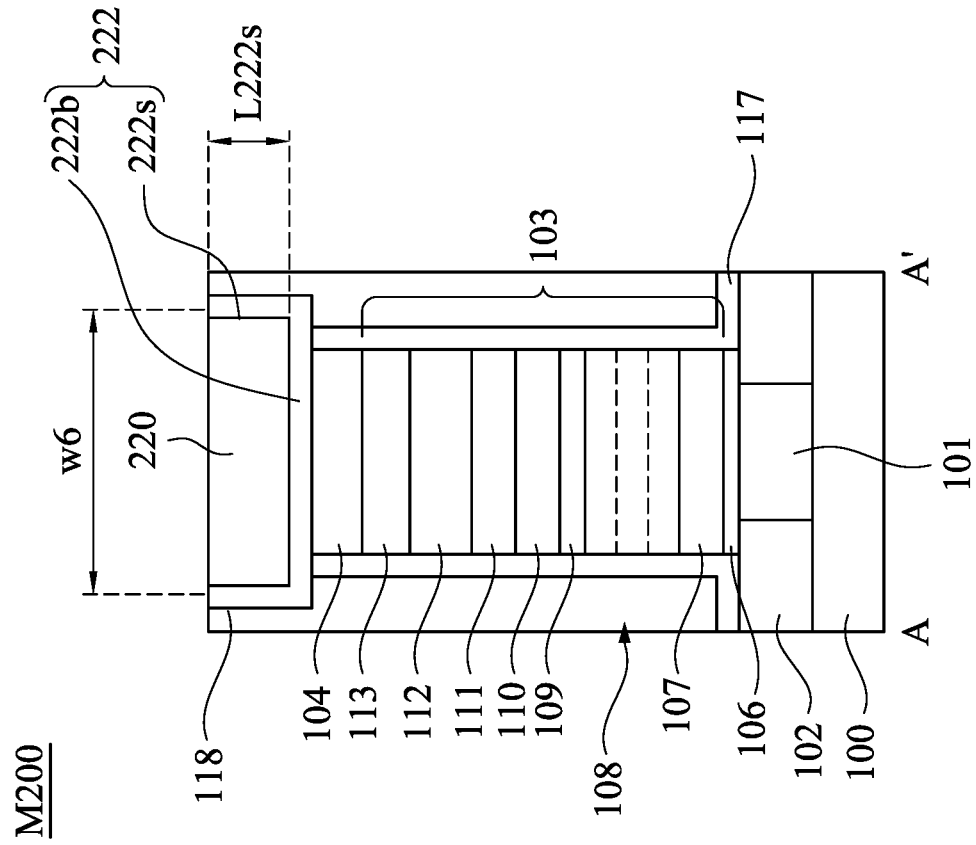
Figure 21:
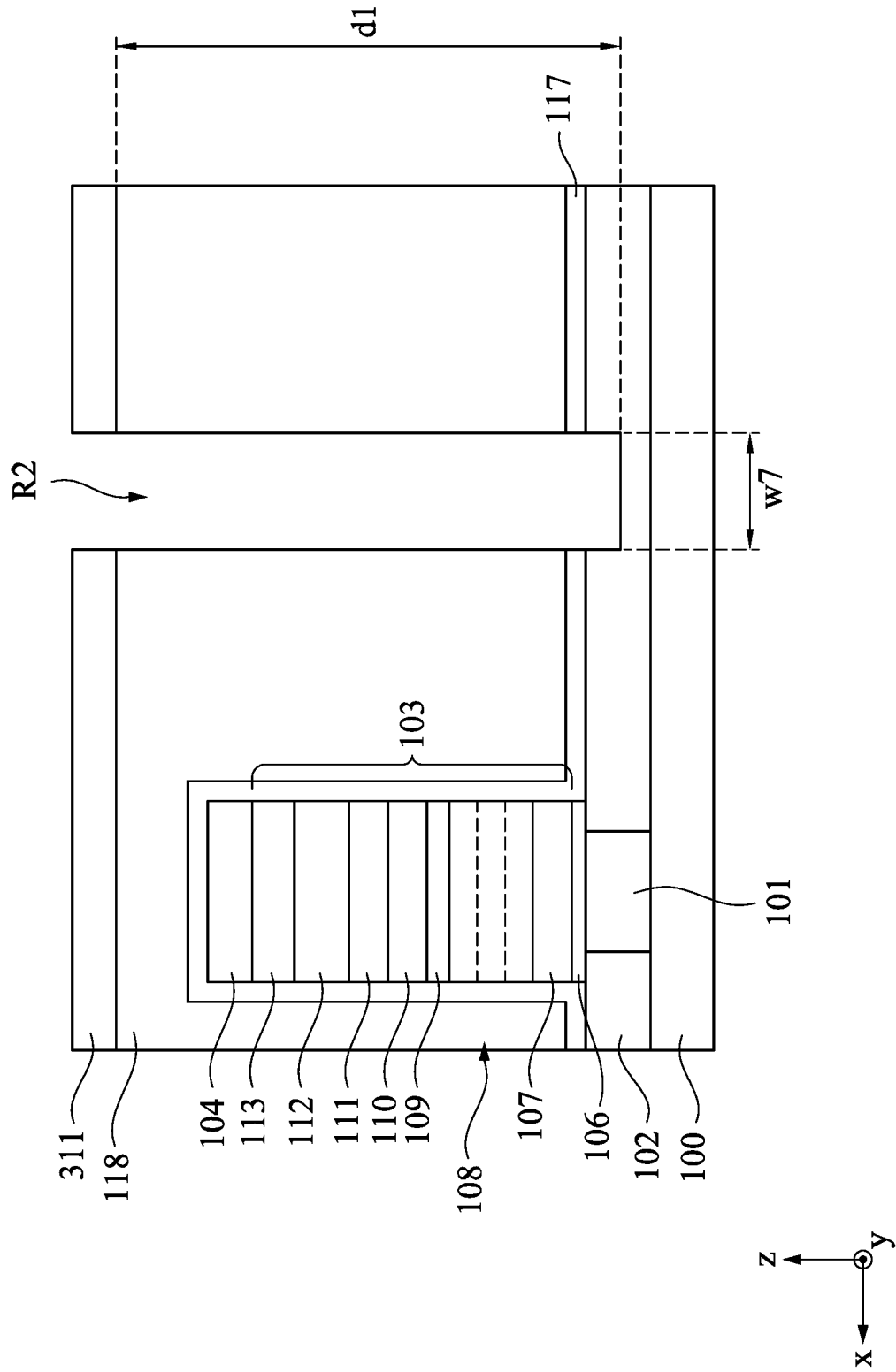
FIGS. 21-26 are cross-sectional views of a memory device with an alternative ferromagnetic metal configuration taken along the cross-sectional plane A-A' according to various aspects of the present disclosure.

FIGS. 19-20 are cross-sectional views of a memory device M200 with an alternative ferromagnetic metal configuration taken along the cross-sectional plane A-A' according to various aspects of the present disclosure. As shown in FIG. 19, a ferromagnetic metal 222 is deposited on the first ILD layer 118 to line sidewalls and a bottom the opening OP1. In detail, the ferromagnetic metal 222 extends along a top of the first ILD layer 118, an inner sidewall of the first ILD layer 118, a top of the encapsulating layer 117 and a top of the top electrode 104. In particular, the ferromagnetic metal 222 is in contact with the top electrode 104. In some embodiments, the ferromagnetic metal 222 has a thickness in a range from 1 nm to 100 nm. The ferromagnetic metal 222 may include Fe/Co-based alloy, CoFeB, CoFe, FeB, Fe, Co, or the like.

Referring to FIG. 20, a conductive line 220 is deposited on the first ILD layer 118 and fills into the opening OP1. In some embodiments, the conductive line 220 includes copper, cobalt, or the like. A planarization process, such as a CMP process, is performed to remove excess materials of the conductive line 220. The remaining portion of the conductive line 220 function as a bit line and has a thickness in a range from 10 nm to µm. In this embodiment, the first ILD layer 118 surrounds both the ferromagnetic metal 222 and the conductive line 220. The ferromagnetic metal 222 is a U-shaped ferromagnetic metal, and the conductive line 220 fills into the ferromagnetic metal 222. For example, the ferromagnetic metal 222 has a side portion 222s and a bottom portion 222b. The bottom portion 222b has a width w6 greater than a length L222s, which extends along the z axis, of the side portion 222s.

The ferromagnetic metal 222 is referred to as a magnetic field induced element, which can provide a magnetic field having magnetic field lines radiate from the north pole to the south pole, as discussed previously with regard to FIG. 5A-5G. For example, the magnetic field provided by the ferromagnetic metal 222 is along the z-axis. The ferromagnetic metal 222 has a bottom width w6 greater than the width w4 of the MTJ stack 103 in order to achieve a sufficient magnetic field to effectively increase an initial torque of the free layer 112 (see FIG. 5B).

Figure 22:
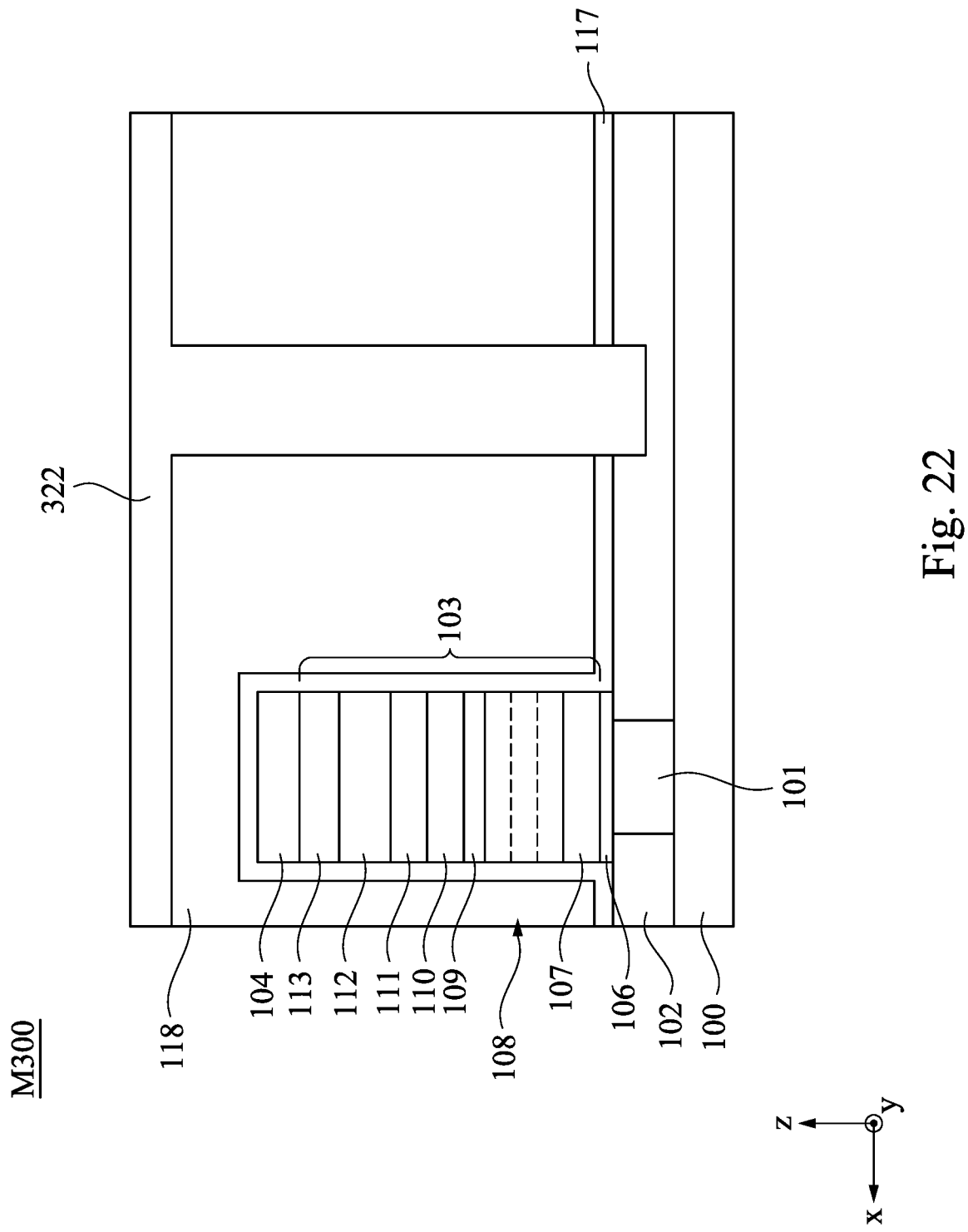
Figure 23:
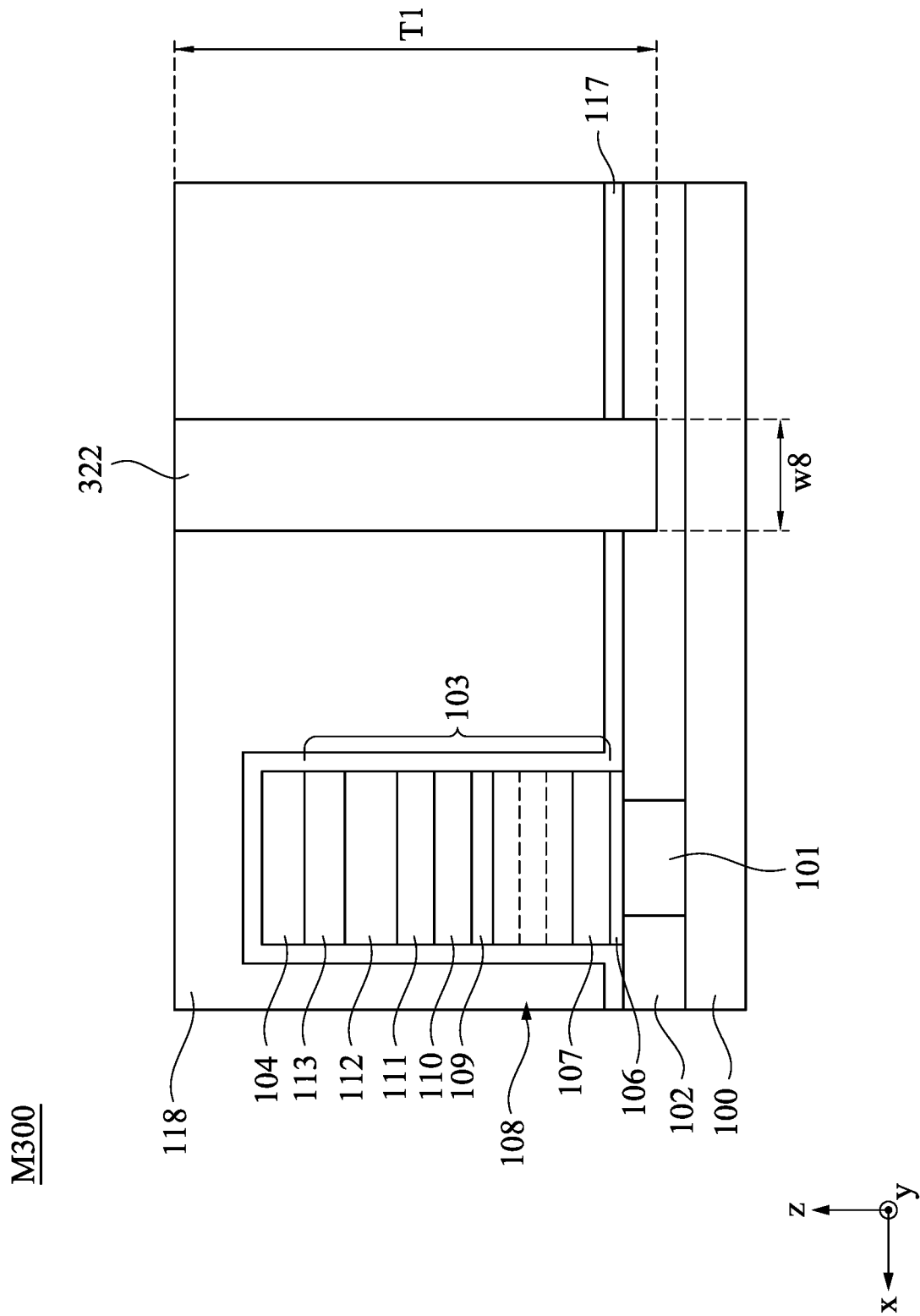
Figure 24:
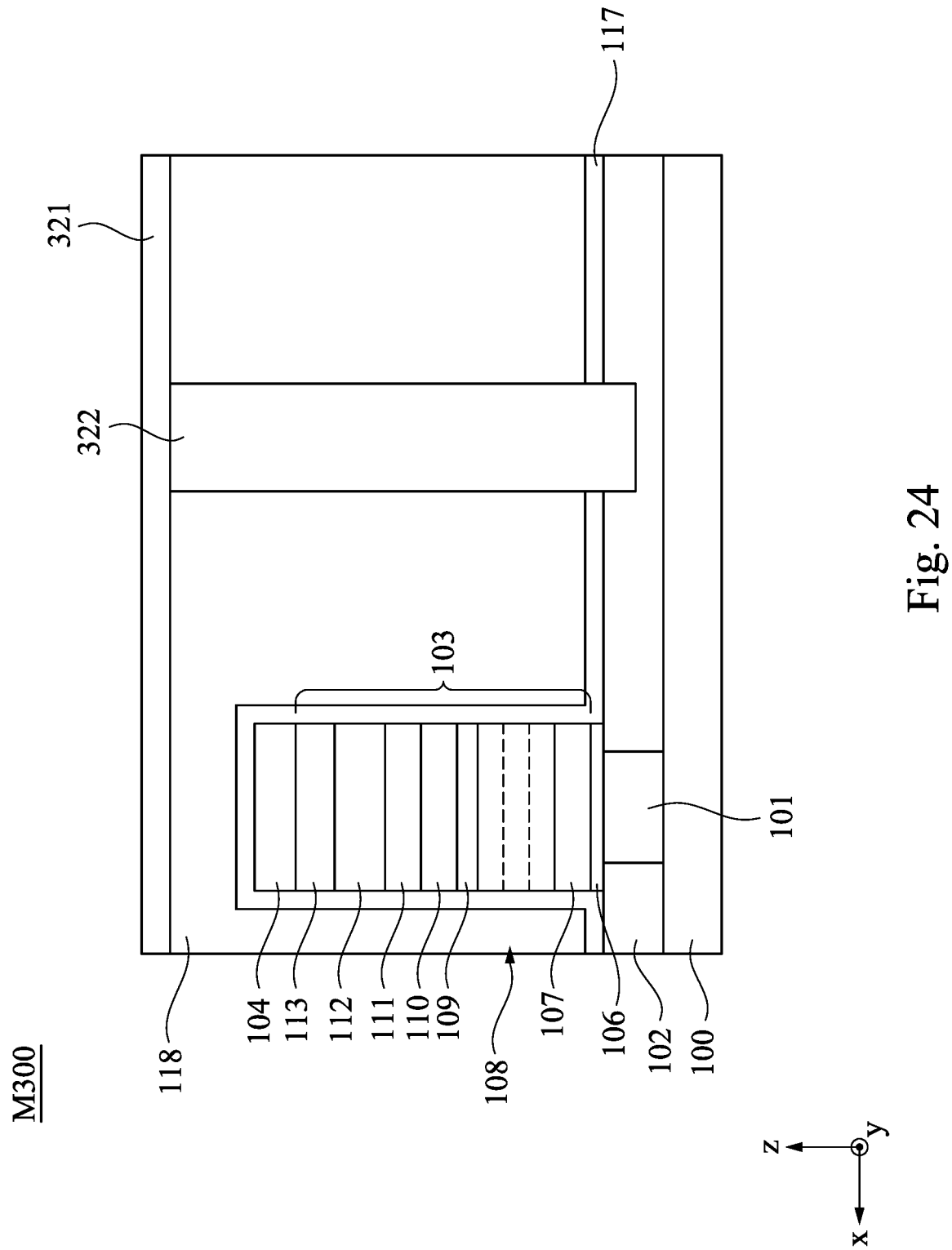

FIGS. 21-26 are cross-sectional views of a memory device M300 with an alternative ferromagnetic metal configuration taken along the cross-sectional plane A-A' according to various aspects of the present disclosure. Referring to FIG. 24, a patterned photoresist 311 is formed on the first ILD layer 118. For example, a resist layer is formed over the first ILD layer 118 and then patterned into the patterned photoresist 311 using a suitable photolithography process such that portions of the first ILD layer 118 is exposed by the patterned photoresist 311. An exemplary photolithography process may include photoresist coating (e.g., spin-on coating), soft baking, mask aligning, exposure, post-exposure baking, developing the photoresist, rinsing, drying (e.g., hard baking), other suitable processes, or combinations thereof.

An etching process is performed to form a recess R2 penetrating through the first ILD layer 118, the encapsulating layer 117 and the dielectric layer 102. The recess R3 has a depth dl greater than a total thickness of the MTJ stack 103, the top electrode 104 and the bottom electrode and the top electrode 104.

Referring to FIG. 22, a ferromagnetic metal 322 is deposited on the first ILD layer 118 and fills into the recess R2. The ferromagnetic metal 322 may include Fe/Co-based alloy, CoFeB, CoFe, FeB, Fe, Co, or the like.

Referring to FIG. 23, a planarization process, such as a CMP process, is performed to remove excess materials of the ferromagnetic metal 322. The first ILD layer 118 is exposed after the planarization process. In some embodiments, the ferromagnetic metal 322 has a thickness in a range from 1 nm to 100 nm. In this embodiment, the ferromagnetic metal 322 is on a lateral side of the MTJ stack 103 and has a width w8 and a thickness T1 greater than the width w8.

The ferromagnetic metal 322 has a top at a position higher than a top of the top electrode 104. The BEVA 101 has a bottom at a position lower than a bottom of the ferromagnetic metal 322. The BEVA 101 has a top at a position higher than a bottom of the ferromagnetic metal 322.

The ferromagnetic metal 322 can function as a magnetic field induced element, which can provide a magnetic field having magnetic field lines radiate from the north pole to the south pole, as discussed previously with regard to FIGS. 7A-7D. For example, the magnetic field provided by the ferromagnetic metal 322 is along the z-axis. The ferromagnetic metal 322 has a thickness T1 greater than the total thickness of the bottom electrode 106, the MTJ stack 103 and the top electrode 104 in order to achieve a sufficient magnetic field to effectively increase an initial torque of the free layer 112.

Reference is made to FIG. 24. A second interlayer dielectric (ILD) layer 321 for insulating the ferromagnetic metal 322 is formed on the first ILD layer 118 and the ferromagnetic metal 322 to cover the ferromagnetic metal 322.

Figure 25:
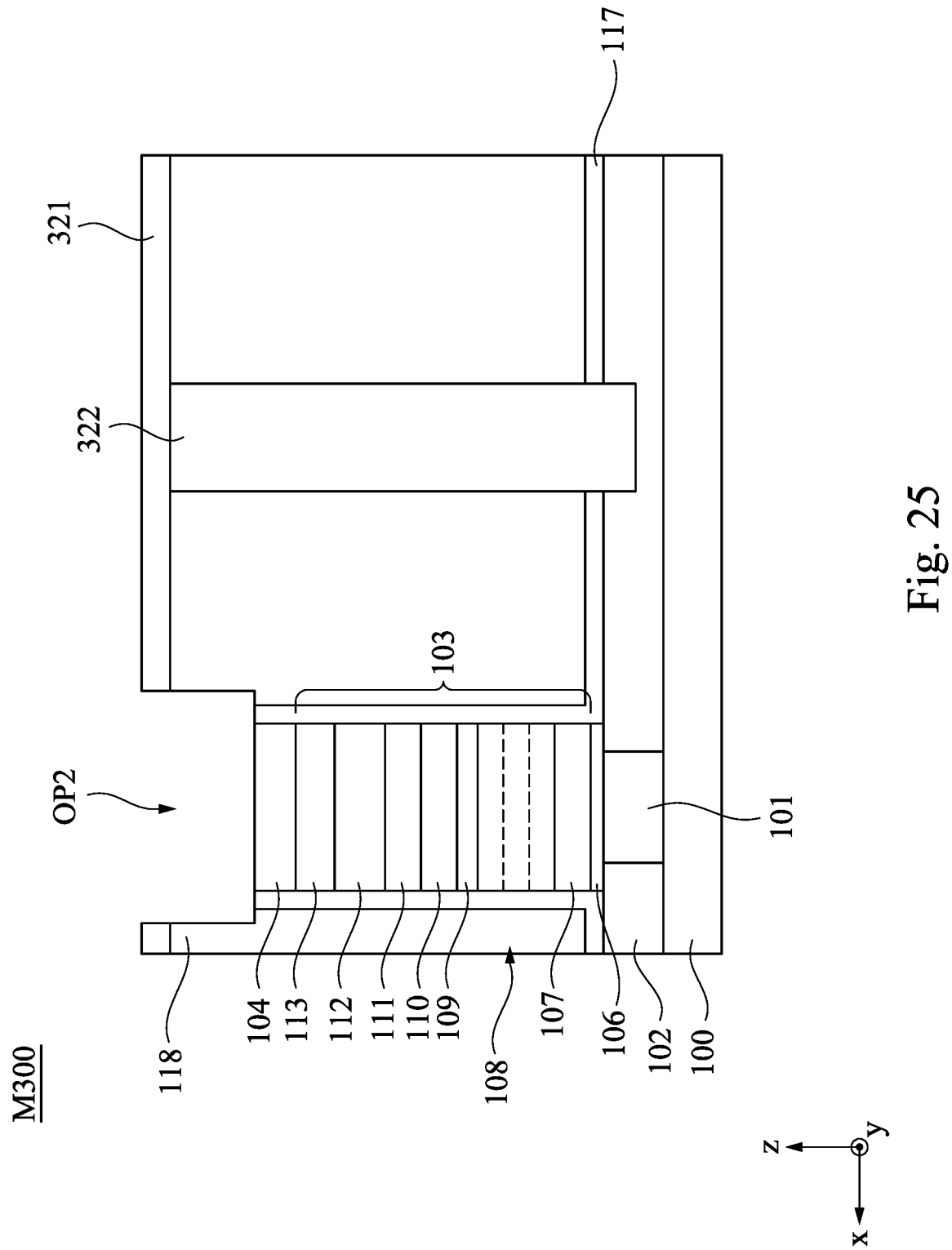

Referring to FIG. 25, an etching process is performed to form an opening OP2 penetrating through the second ILD layer 321, the first ILD layer 118 and the encapsulating layer 117, thereby exposing the top electrode 104.

Figure 26:
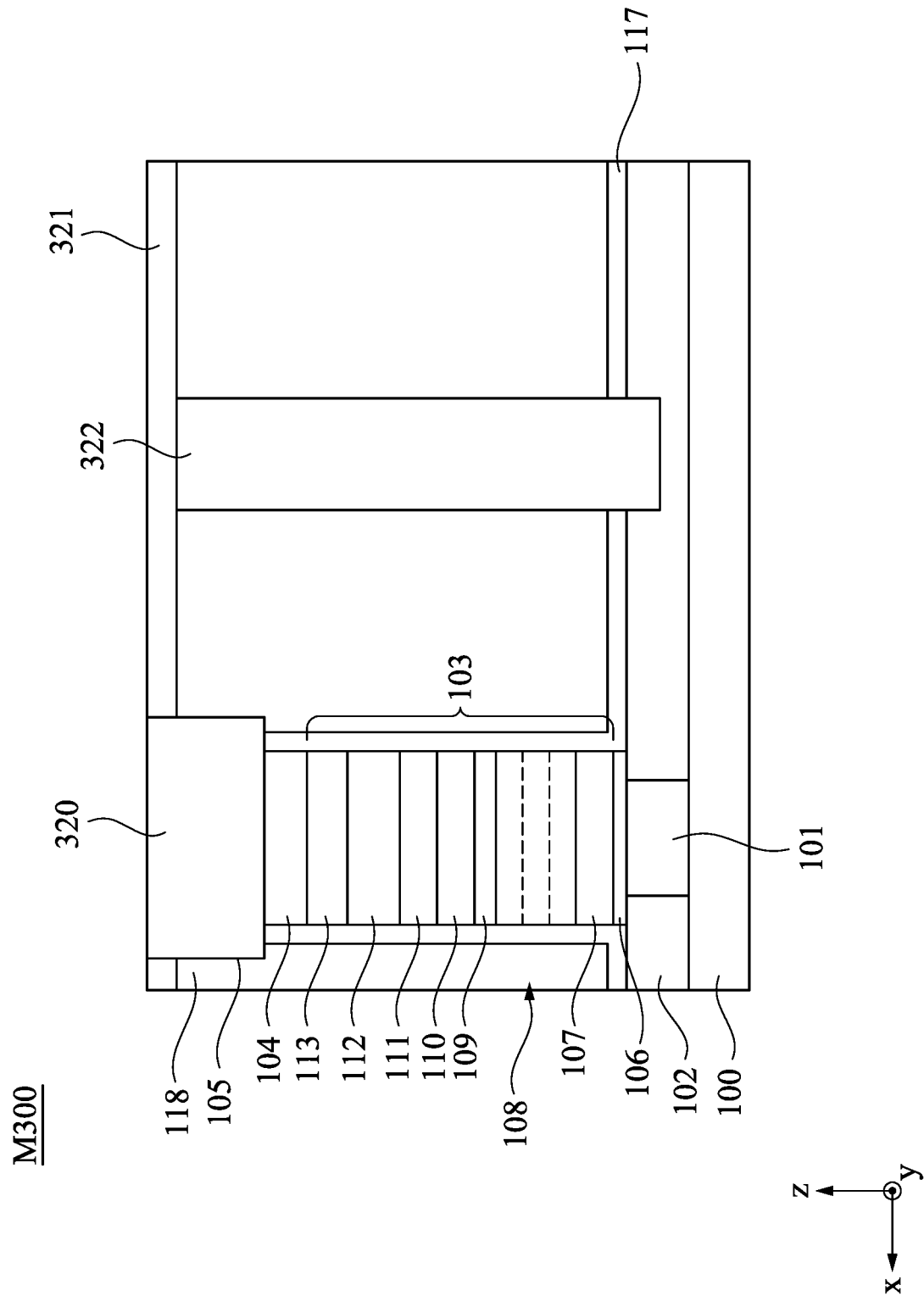

Referring to FIG. 26, a conductive line 320 is deposited on the second ILD layer 321 and fills into the opening OP2. A planarization process, such as a CMP process, is performed to remove excess materials of the conductive line 320. The conductive line 320 can function as a bit line and has a thickness in a range from 10 nm to µm. In some embodiments, the conductive line 320 includes copper, cobalt, or the like. The top of the ferromagnetic metal 322 is at a position lower than a top of the conductive line 320.

Based on the above discussion, it can be seen that the present disclosure offers advantages. It is understood, however, that other embodiments may offer additional advantages, and not all advantages are necessarily disclosed herein, and that no particular advantages is required for all embodiments. One advantage is that the P-to-AP switching speed can be improved. Another advantage is that the magnetic field induced element includes Fe/Co-based alloy, CoFeB, CoFe, FeB, Fe, Co, or the like, which is compatible with back-end of line (BEOL) process. Yet another advantage is that an additional current through a metal line to generate a magnetic field is not required, which in turn prevents disturbing the whole column of the MTJ structures in an integrated device.

In some embodiments, a method of forming a memory device including forming a bottom electrode via (BEVA) in a dielectric layer, forming a magnetic tunnel junction (MTJ) multilayer structure over the BEVA, forming a top electrode on the MTJ multilayer structure, patterning the MTJ multilayer structure using the top electrode as an etch mask to form a MTJ stack, forming a first interlayer dielectric (ILD) layer over the MTJ stack, and after forming the first ILD layer, forming a ferromagnetic metal that exerts a magnetic field on the MTJ stack. In some embodiments, forming the ferromagnetic metal includes forming a second ILD layer on the first ILD layer, forming an opening in the second ILD layer, and filling the opening with the ferromagnetic metal. In some embodiments, forming the ferromagnetic metal includes forming an opening in the first ILD layer and forming the ferromagnetic metal in the opening. In some embodiments, the ferromagnetic metal conformally lines the opening. In some embodiments, the method further includes after forming the ferromagnetic metal, filling a remaining portion of the opening with copper. In some embodiments, the method further includes forming a second ILD layer on the first ILD layer, the second ILD layer has a thickness less than a thickness of the first ILD layer. In some embodiments, the method further includes forming an opening penetrating through the second ILD layer and the first ILD layer to expose the top electrode and forming a conductive line in the opening. In some embodiments, forming the ferromagnetic metal includes forming an opening penetrating through the second ILD layer and the dielectric layer and filling the opening with the ferromagnetic metal. In some embodiments, the ferromagnetic metal includes Fe/Co-based alloy, CoFeB, CoFe, FeB, Fe or Co.

In some embodiments, a method of forming a memory device includes forming a bottom electrode via (BEVA) in a dielectric layer, forming a magnetic tunnel junction (MTJ) multilayer structure on the BEVA, forming a top electrode on the MTJ multilayer structure, patterning the MTJ multilayer structure using the top electrode as an etch mask to form a MTJ stack, forming an interlayer dielectric (ILD) layer laterally surrounding the MTJ stack, and forming a ferromagnetic metal extending through the ILD layer. In some embodiments, forming the ferromagnetic metal includes etching the ILD layer to form an opening extending through the ILD layer and depositing the ferromagnetic metal in the opening in the ILD layer. In some embodiments, the ferromagnetic metal has a bottom width greater than a top width of the top electrode. In some embodiments, the ferromagnetic metal has a bottom surface lower than a bottom surface of the ILD layer. In some embodiments, the ferromagnetic metal has a bottom surface lower than a top surface of the BEVA. In some embodiments, the ferromagnetic metal has a top surface higher than a top surface of the MTJ stack, and a bottom surface lower than a bottom surface of the MTJ stack. In some embodiments, the method further includes forming an encapsulating layer laterally surrounding the MTJ stack before forming the ILD layer. In some embodiments, the ferromagnetic metal further extends through the encapsulating layer.

In some embodiments, a memory device includes a bottom electrode, a magnetic tunnel junction (MTJ) stack, a top electrode, a first interlayer dielectric (ILD) layer and a ferromagnetic metal. The magnetic tunnel junction (MTJ) stack is on the bottom electrode. The MTJ stack includes a reference layer having a fixed magnetization direction, a tunnel barrier layer on the reference layer and a free layer on the tunnel barrier layer having a switchable magnetization direction. The top electrode is on the MTJ stack. The first interlayer dielectric (ILD) layer surrounds the MTJ stack and the top electrode. The ferromagnetic metal is over the MTJ stack and spaced apart from the MTJ stack. In some embodiments, the ferromagnetic metal has a lateral dimension greater than a lateral dimension of the MTJ stack. In some embodiments, the ferromagnetic metal has a U-shaped cross-section.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a memory device, comprising:
  forming a bottom electrode via (BEVA) in a dielectric layer;
  forming a magnetic tunnel junction (MTJ) multilayer structure over the BEVA;
  forming a top electrode on the MTJ multilayer structure;
  patterning the MTJ multilayer structure using the top electrode as an etch mask to form a MTJ stack;
  forming a first interlayer dielectric (ILD) layer over the MTJ stack;
  after forming the first ILD layer, forming a ferromagnetic metal that exerts a magnetic field on the MTJ stack along a direction parallel with a top surface of the MTJ stack;
  prior to forming the first ILD layer over the MTJ stack, forming an encapsulating layer to encapsulate the MTJ stack and the top electrode;
  etching the first ILD layer and the encapsulating layer to form a first opening; and
  forming a conductive line in the first opening; and
  prior to forming the ferromagnetic metal over the first ILD layer, forming a second interlayer dielectric (ILD) layer over the conductive line.

2. The method of claim 1, wherein forming the ferromagnetic metal comprises:
  forming a second opening in the second ILD layer; and
  filling the second opening with the ferromagnetic metal.

3. The method of claim 1, wherein the encapsulating layer includes SiN.

4. A memory device, comprising:
  a bottom electrode;

a magnetic tunnel junction (MTJ) stack on the bottom electrode, wherein the MTJ stack comprises:
- a reference layer having a fixed magnetization direction;
- a tunnel barrier layer on the reference layer; and
- a free layer on the tunnel barrier layer having a switchable magnetization direction;

a top electrode on the MTJ stack;

a first interlayer dielectric (ILD) layer surrounding the MTJ stack and the top electrode;

a ferromagnetic metal over the MTJ stack and spaced apart from the MTJ stack, wherein the ferromagnetic metal has a magnetic field along a horizontal direction;

an encapsulating layer encapsulating the MTJ stack and the top electrode;

a conductive line embedded in the first ILD layer and over the encapsulating layer; and a second interlayer dielectric (ILD) layer over the conductive line.

5. The memory device of claim 4, wherein the ferromagnetic metal has a lateral dimension greater than a lateral dimension of the MTJ stack.

6. The memory device of claim 4, wherein the ferromagnetic metal has a U-shaped cross-section.

7. A method of forming a memory device, comprising:
- forming a bottom electrode via (BEVA) in a dielectric layer;
- forming a magnetic tunnel junction (MTJ) multilayer structure over the BEVA;
- forming a top electrode on the MTJ multilayer structure;
- patterning the MTJ multilayer structure using the top electrode as an etch mask to form a MTJ stack;
- forming a first interlayer dielectric (ILD) layer over the MTJ stack;
- forming a ferromagnetic metal over the first ILD layer, wherein the ferromagnetic metal has a height and a width greater than the height;
- prior to forming the first ILD layer over the MTJ stack, forming an encapsulating layer to encapsulate the MTJ stack and the top electrode;
- etching the first ILD layer and the encapsulating layer to form an opening; and
- forming a conductive line in the opening; and
- prior to forming the ferromagnetic metal over the first ILD layer, forming a second interlayer dielectric (ILD) layer over the conductive line.

8. The method of claim 7, wherein the ferromagnetic metal has a width different from a width of the top electrode.

9. The method of claim 7, wherein the ferromagnetic metal has a width greater than a width of the top electrode.

10. The method of claim 7, wherein the ferromagnetic metal has a width different from a width of the MTJ stack.

11. The method of claim 7, wherein the ferromagnetic metal has a width greater than a width of the MTJ stack.

12. The method of claim 7, wherein the top electrode has a width same as a width of the MTJ stack.

13. The method of claim 7, wherein the top electrode has a width different from a width of the BEVA.

14. The method of claim 7, wherein the top electrode has a width greater than a width of the BEVA.

15. The method of claim 7, wherein the ferromagnetic metal comprises Fe-based alloy, Co-based alloy, CoFeB, CoFe, FeB, Fe, or Co.

16. The method of claim 7, wherein the ferromagnetic metal is embedded in the second ILD layer.

17. The method of claim 7, wherein the second ILD layer has a U-shaped cross-section.

18. The method of claim 7, wherein the conductive line has a width greater than a width of the MTJ stack.

19. The method of claim 7, wherein forming the encapsulating layer comprises forming the encapsulating layer laterally surrounding the MTJ stack.

20. The method of claim 7, wherein forming the encapsulating layer comprises forming the encapsulating layer encapsulates the bottom electrode.

* * * * *